United States Patent
Hirshbain

(10) Patent No.: US 9,454,868 B2
(45) Date of Patent: Sep. 27, 2016

(54) SYSTEM AND METHOD FOR VENDING PRODUCTS

(71) Applicant: NEO ECO SYSTEMS LTD., Jerusalem (IL)

(72) Inventor: Shlomo Hirshbain, Jerusalem (IL)

(73) Assignee: NEO ECO SYSTEMS LTD., Jerusalem (IL)

( * ) Notice: Subject to any disclaimer, the term of this patent is extended or adjusted under 35 U.S.C. 154(b) by 0 days.

(21) Appl. No.: 14/376,168

(22) PCT Filed: Jan. 31, 2013

(86) PCT No.: PCT/IB2013/050841
§ 371 (c)(1),
(2) Date: Aug. 1, 2014

(87) PCT Pub. No.: WO2013/114321
PCT Pub. Date: Aug. 8, 2013

(65) Prior Publication Data
US 2014/0379123 A1  Dec. 25, 2014

Related U.S. Application Data

(60) Provisional application No. 61/593,880, filed on Feb. 2, 2012, provisional application No. 61/593,879, filed on Feb. 2, 2012, provisional application No. 61/595,093, filed on Feb. 5, 2012.

(51) Int. Cl.
*G06F 17/00* (2006.01)
*G07F 11/62* (2006.01)
(Continued)

(52) U.S. Cl.
CPC ............... *G07F 11/62* (2013.01); *G05B 15/02* (2013.01); *G06Q 10/087* (2013.01); *G07F 11/002* (2013.01); *G07F 11/165* (2013.01); *G07F 11/18* (2013.01); *G07F 11/38* (2013.01)

(58) Field of Classification Search
None
See application file for complete search history.

(56) References Cited

U.S. PATENT DOCUMENTS

| 4,858,743 A * | 8/1989 | Paraskevakos | G07F 11/62 194/205 |
| 4,860,876 A * | 8/1989 | Moore | G07F 7/069 194/205 |

(Continued)

FOREIGN PATENT DOCUMENTS

| CN | 1427974 A | 7/2003 |
| CN | 101128177 A | 2/2008 |

(Continued)

*Primary Examiner* — Prasad Gokhale
(74) *Attorney, Agent, or Firm* — Browdy and Neimark, PLLC

(57) ABSTRACT

A vending machine comprising two or more compartmentalized storage units (CSUs), each comprising a compartment array configured for accommodating items in different compartments of the grid. The items are independently accessible; a retrieval system configured for accessing the compartments to retrieve an item and providing it to a desired location within the vending machine, other than its respective compartment; a controller associated with an items map indicative of the content and location of the items within the compartment array of the CSU. The controller is configured for operating the retrieval system to access an item based on the items map; The controller is further configured for receive an indication of the location of an first empty compartment, which contains no item therein, in a first CSU, to transfer a first item from a second compartment of a second CSU to the first empty compartment; and to update the items map to indicate that the second compartment is empty and that the first item is located at the first compartment.

14 Claims, 32 Drawing Sheets

(51) Int. Cl.
*G07F 11/00* (2006.01)
*G06Q 10/08* (2012.01)
*G07F 11/16* (2006.01)
*G07F 11/18* (2006.01)
*G07F 11/38* (2006.01)
*G05B 15/02* (2006.01)

(56) References Cited

U.S. PATENT DOCUMENTS

| | | | | |
|---|---|---|---|---|
| 4,967,906 | A * | 11/1990 | Morello | G07F 11/62 206/387.1 |
| 5,444,749 | A * | 8/1995 | Nambu | G01G 19/387 177/25.18 |
| 6,216,910 | B1 * | 4/2001 | Numerick | G07F 11/52 221/7 |
| 8,121,725 | B2 * | 2/2012 | Baker | G07F 11/26 221/119 |
| 2001/0051905 | A1 | 12/2001 | Lucas | |
| 2002/0032501 | A1 | 3/2002 | Tilles et al. | |
| 2005/0192705 | A1 * | 9/2005 | Pinney | G06F 19/3462 700/241 |
| 2005/0216120 | A1 * | 9/2005 | Rosenberg | G07F 11/54 700/244 |
| 2005/0236417 | A1 * | 10/2005 | Baker | G07F 11/26 221/92 |
| 2006/0058724 | A1 * | 3/2006 | Handfield | A61J 7/0084 604/20 |
| 2006/0136095 | A1 | 6/2006 | Rob et al. | |
| 2006/0259190 | A1 | 11/2006 | Hale | |
| 2007/0043469 | A1 * | 2/2007 | Draper | G06F 19/3462 700/231 |
| 2008/0272138 | A1 | 11/2008 | Ross et al. | |
| 2010/0138037 | A1 * | 6/2010 | Adelberg | G06Q 10/087 700/241 |

FOREIGN PATENT DOCUMENTS

| | | | | |
|---|---|---|---|---|
| EP | 2587460 A1 | 5/2013 | | |
| WO | 01/67356 A1 | 9/2001 | | |
| WO | 2006/069361 A2 | 6/2006 | | |
| WO | 2008/085673 A1 | 7/2008 | | |
| WO | WO 2008085673 A1 * | 7/2008 | | B65B 5/103 |
| WO | 2009/050710 A2 | 4/2009 | | |
| WO | 2011/161809 A1 | 12/2011 | | |

* cited by examiner

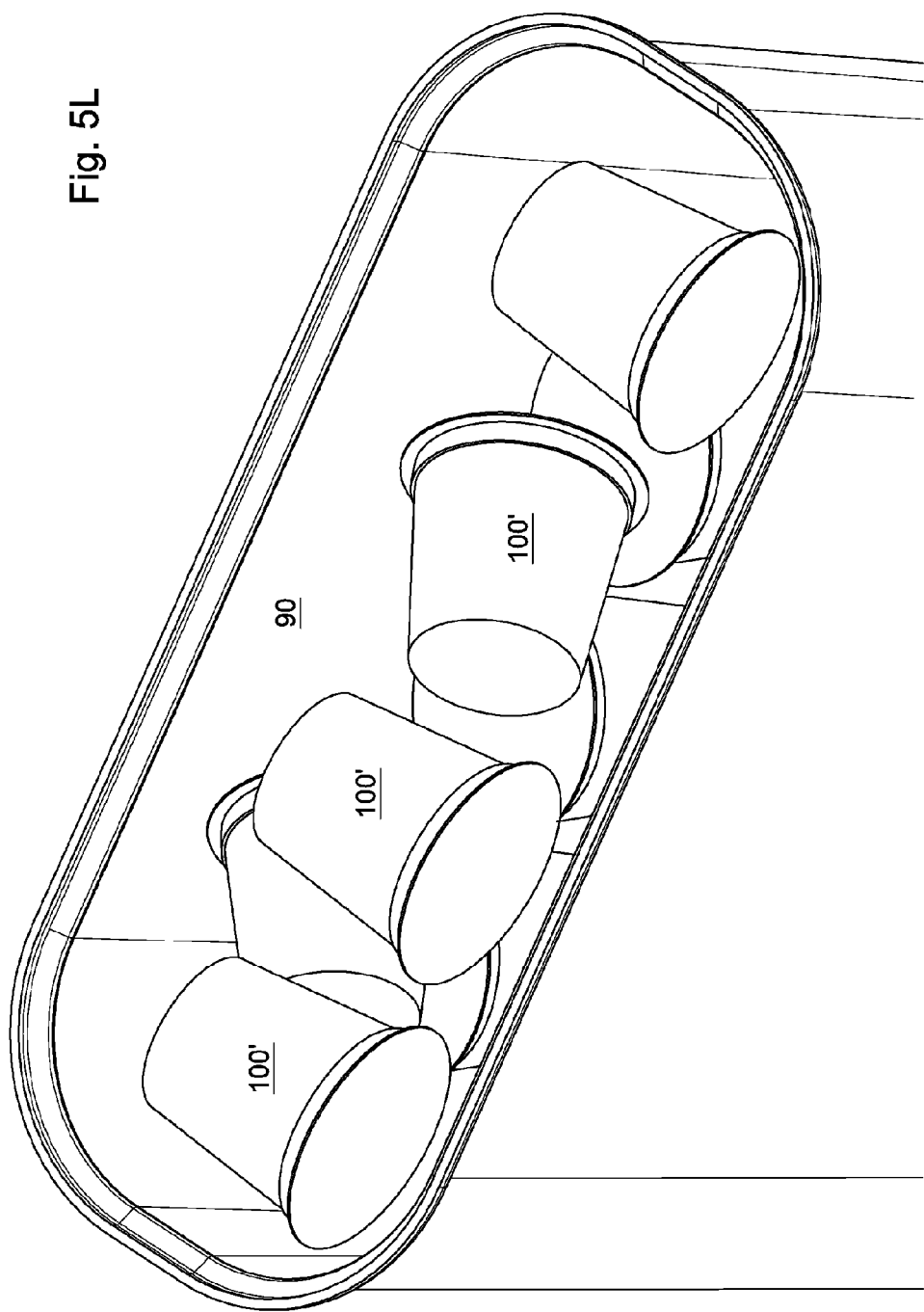

SYSTEM AND METHOD FOR VENDING PRODUCTS

TECHNOLOGICAL FIELD

The presently disclosed subject matter relates to the field of vending machines and operation thereof.

BACKGROUND

References considered to be relevant as background to the presently disclosed subject matter are listed below:

WO 2009/050710 (Hirschbain, shlomo), published Apr. 23, 2009, discloses a mix-in-the-cup automated beverage dispensing machine which includes a powder dispensing system with a rotary support structure bringing each powder container to a common dispensing location in turn. The machine also provides a water heater with a thermal conduction block and a method for heating water based on pre-calculation of the required heating profile. Also provided is a fresh milk dispensing system which maintains a fully cooled flow path from the container to the cup while ensuring that all components contacting the milk are disposable single-use components. Additional features discussed relate to a mixer unit cleaned by spinning within the cup, a structurally simple cup conveyance arrangement, and a cup elevator with geometrical locking.

Acknowledgement of the above references herein is not to be inferred as meaning that these are in any way relevant to the patentability of the presently disclosed subject matter.

GENERAL DESCRIPTION

According to one aspect of the subject matter of the present application there is provided a vending machine comprising:

Two or more compartmentalized storage units (CSUs), each comprising a compartment array configured for accommodating two or more items in different compartments of the grid, the items being independently accessible;

a retrieval system configured for accessing at least one of the compartments to retrieve at least one of the two or more items and providing the retrieved item to a desired location within the vending machine, other than its respective compartment;

a controller associated with an items map indicative of the content and location of at least one of the two or more items within the compartment array of the CSU, the controller being configured for operating the retrieval system to access at least one of the two or more items based on the items map;

wherein the controller is further configured for:

receive an indication of the location of at least a first empty compartment, which contains no item therein, in at least a first CSU of the CSUs;

transfer at least a first item from a second compartment of a second CSU of the CSUs to the first empty compartment; and update the items map to indicate that the second compartment is empty and that the first item is located at the first compartment.

In some cases the first CSU is a rapid access CSU, that is accessible in a standby mode of the vending machine.

In some cases the first CSU is associated with a first emptying priority and the second CSU is associated with a second emptying priority, and wherein the second emptying priority is higher than the first emptying priority.

In some cases the controller is further configured to: receive an indication of one or more given items within the first CSU, the given items meeting an expiration date return threshold indicative of nearing the expiration date of the one or more given items; and transfer at least one of the given items to a given compartment of the second CSU.

According to another aspect of the subject matter of the present application there is provided a vending machine comprising:

At least one compartmentalized storage unit (CSUs) configured with an array of compartments for accommodating two or more items at different locations of the array, the items being independently accessible, wherein the CSU is removably received within the vending machine, thereby enabling replacement thereof with a new CSU;

a retrieval system configured for accessing the compartment array to retrieve items therefrom and providing a retrieved item to a desired location within the vending machine;

a controller associated with an items map of the array the map indicative of the content and location of the items within the compartment array of the CSU, the controller configured for operating the retrieval system to access different locations of the array based on the items map providing an output signal responsive to which the items map is updated following the retrieval of an item from the compartment array;

wherein the controller is further configured to:

receive, at the vending machine, CSU identification data enabling identification of a new CSU;

authenticate the new CSU, using at least the CSU identification data; and in case the authentication is successful, receive an update to the items map, the update being indicative of the content of a plurality of compartments of the new CSU.

In some cases the controller is further configured to: receive a product dispensing request including data indicative of a selected product type; retrieve from the items map a location of one or more items required for dispensing of a product of the selected product type; dispense the product utilizing the one or more items; and update the items map to indicate that the locations of the one or more items are empty.

In some cases the controller is further configured to: receive an indication of at least a first compartment that is empty in at least a first CSU of the CSUs; transfer at least a first item from a second compartment of a second CSU of the CSUs to the first compartment; and update the items map to indicate that the second compartment is empty and that the first item is located at the first compartment.

In some cases the controller is further configured to send a consumption report to a back-office system, wherein the consumption report includes information indicative of the utilization of the one or more items.

In some cases the consumption report is sent to the back-office system following determination that the inventory levels of the vending machine are low.

In some cases the consumption report is sent to the back-office system every pre-determined time window.

In some cases the consumption report is send to the back-office system following the updating of the items map.

In some cases the consumption report is send to the back-office system following a request from the back-office system.

In some cases the request is sent prior to a visit of a supplier to the vending machine.

In some cases the one or more items have the nearest expiration date.

In some cases the items map is received via direct wired or short-range wireless communications from a portable electronic device.

In some cases the items map is delivered from a back-office system via a wide area network (WAN).

In some cases the items map is encrypted at least during the receiving and wherein the items map data is decrypted after the receiving.

In some cases the vending machine further comprises a CSU reader configured to read the CSU identification data.

In some cases the CSU identification data is a CSU ID.

In some cases the new CSU is associated with a destination vending machine ID and wherein during the authenticate, the controller is configured to verify that the destination vending machine ID associated with the new CSU is identical to a vending machine ID of the vending machine.

According to another aspect of the subject matter of the present application there is provided a method for refilling a vending machine comprising one or more compartmentalized storage units (CSUs), the method comprising:

receiving, at the vending machine, CSU identification data enabling identification of a new CSU, wherein the new CSU comprises a plurality of compartments;

authenticating the new CSU, using at least the CSU identification data; and in case the authentication is successful, receiving an items map indicative of the content of a plurality of compartments of the new CSU.

In some cases the method further comprises:

receiving a product dispensing request including data indicative of a selected product type;

retrieving from the items map a location of one or more items required for dispensing of a product of the selected product type;

dispensing the product utilizing the one or more items; and updating the items map to indicate that the locations of the one or more items are empty.

In some cases the method further comprises: receiving an indication of at least a first compartment that is empty in at least a first CSU of the CSUs; transferring at least a first item from a second compartment of a second CSU of the CSUs to the first compartment; and updating the items map to indicate that the second compartment is empty and that the first item is located at the first compartment.

In some cases the method further comprises sending a consumption report to a back-office system, wherein the consumption report includes information indicative of the utilization of the one or more items.

In some cases the consumption report is sent to the back-office system following determination that the inventory levels of the vending machine are low.

In some cases the consumption report is sent to the back-office system every pre-determined time window.

In some cases the consumption report is sent to the back-office system following the updating of the items map.

In some cases the consumption report is sent to the back-office system following a request from the back-office system.

In some cases the request is sent prior to a visit of a supplier to the vending machine.

In some cases the one or more items have the nearest expiration date.

In some cases the items map is received via direct wired or short-range wireless communications from a portable electronic device.

In some cases the items map is delivered from a back-office system via a wide area network (WAN).

In some cases the items map is encrypted at least during the receiving and wherein the items map data is decrypted after the receiving.

In some cases the vending machine further comprises a CSU reader configured to read the CSU identification data.

In some cases the CSU identification data is a CSU ID.

In some cases the new CSU is associated with a destination vending machine ID and wherein the authenticating comprises verifying that the destination vending machine ID associated with the new CSU is identical to a vending machine ID of the vending machine.

According to another aspect of the subject matter of the present application there is provided a method for distributing a plurality of items between a plurality of compartmentalized storage units (CSUs), the method comprising:

providing an items map indicative of the content of a plurality of compartments of the plurality of CSUs;

receiving an indication of at least a first compartment that is empty in at least a first CSU of the CSUs;

transferring at least a first item from a second compartment of a second CSU of the CSUs to the first compartment; and updating the items map to indicate that the second compartment is empty and that the first item is located at the first compartment.

In some cases the first CSU is a rapid access CSU, that is accessible in a standby mode of the vending machine.

In some cases the first CSU is associated with a first emptying priority and the second CSU is associated with a second emptying priority, and wherein the second emptying priority is higher than the first emptying priority.

In some cases the method further comprises: receiving an indication of one or more given items within the first CSU, the given items meeting an expiration date return threshold indicative of nearing the expiration date of the one or more given items; transferring at least one of the given items to a given compartment of the second CSU.

According to another aspect of the subject matter of the present application there is provided a vending machine comprising one or more compartmentalized storage units (CSUs), the vending machine comprising a controller configured to:

receive, at the vending machine, CSU identification data enabling identification of a new CSU, wherein the new CSU comprises a plurality of compartments;

authenticate the new CSU, using at least the CSU identification data; and in case the authentication is successful, receive an items map indicative of the content of a plurality of compartments of the new CSU.

In some cases the controller is further configured to: receive a product dispensing request including data indicative of a selected product type; retrieve from the items map a location of one or more items required for dispensing of a product of the selected product type; dispense the product utilizing the one or more items; and update the items map to indicate that the locations of the one or more items are empty.

In some cases the controller is further configured to: receive an indication of at least a first compartment that is empty in at least a first CSU of the CSUs; transfer at least a first item from a second compartment of a second CSU of the CSUs to the first compartment; and update the items map to indicate that the second compartment is empty and that the first item is located at the first compartment.

In some cases the controller is further configured to send a consumption report to a back-office system, wherein the consumption report includes information indicative of the utilization of the one or more items.

In some cases the consumption report is sent to the back-office system following determination that the inventory levels of the vending machine are low.

In some cases the consumption report is sent to the back-office system every pre-determined time window.

In some cases the consumption report is send to the back-office system following the updating of the items map.

In some cases the consumption report is send to the back-office system following a request from the back-office system.

In some cases the request is sent prior to a visit of a supplier to the vending machine.

In some cases the one or more items have the nearest expiration date.

In some cases the items map is received via direct wired or short-range wireless communications from a portable electronic device.

In some cases the items map is delivered from a back-office system via a wide area network (WAN).

In some cases the items map is encrypted at least during the receiving and wherein the items map data is decrypted after the receiving.

In some cases the vending machine further comprises a CSU reader configured to read the CSU identification data.

In some cases the CSU identification data is a CSU ID.

In some cases the new CSU is associated with a destination vending machine ID and wherein during the authenticate, the controller is configured to verify that the destination vending machine ID associated with the new CSU is identical to a vending machine ID of the vending machine.

According to another aspect of the subject matter of the present application there is provided a system for distributing a plurality of items between a plurality of compartmentalized storage units (CSUs) of a vending machine, the system comprising a controller configured to:

provide an items map indicative of the content of a plurality of compartments of the plurality of CSUs;

receive an indication of at least a first compartment that is empty in at least a first CSU of the CSUs;

transfer at least a first item from a second compartment of a second CSU of the CSUs to the first compartment; and update the items map to indicate that the second compartment is empty and that the first item is located at the first compartment.

In some cases the first CSU is a rapid access CSU, that is accessible in a standby mode of the vending machine.

In some cases the first CSU is associated with a first emptying priority and the second CSU is associated with a second emptying priority, and wherein the second emptying priority is higher than the first emptying priority.

In some cases the controller is further configured to: receive an indication of one or more given items within the first CSU, the given items meeting an expiration date return threshold indicative of nearing the expiration date of the one or more given items; transfer at least one of the given items to a given compartment of the second CSU.

According to one aspect of the subject matter of the present application there is provided a vending machine comprising:

At least one compartmentalized storage unit (CSUs) configured with an array of compartments for accommodating two or more items at different locations of the array, the items being independently accessible;

a retrieval system configured for accessing the compartment array to retrieve items therefrom and providing a retrieved item to a desired location within the vending machine;

a controller associated with an items map of the array said map indicative of the content and location of the items within the compartment array of the CSU, the controller configured for operating said retrieval system to access different locations of the array based on said items map providing an output signal responsive to which said items map is updated following the retrieval of an item from the compartment array.

The CSU can be in the form of a tray having an operational surface and wherein said compartments are accessible through said operational surface. In particular, said compartments can be in the form of cavities, slots or compartments formed in the operational surface.

The CSU can further be formed with a side rim having engagement ports for engaging a portion of the retrieval system. In addition, the CSU can comprise a plurality of support elements extending from an opposite side to the operational surface, and are configured for supporting the weight of the tray.

The vending machine can comprise a plurality of CSUs closely stacked one on top of the other. In particular, a gap g between two neighboring CSUs is insufficient for allowing retrieval of an item from the compartment array. The compartment array of one or more CSUs can thus be configured for storing a plurality of individual items/products, e.g. coffee capsules, packages for the preparation of a beverage/snack, various additives relating to the preparation or vending of the products and/or the snack itself. Additional examples can include different types of ground coffee, flavored coffee, tea, fruit juice concentrate, and any other sort of infusion, soluble powder or concentrate used to prepare a hot or cold beverage). However, the invention is not limited to such beverage dispensing, and may alternatively or additionally be used for vending any and all other small items stored in separate sealed packages (such as medications, toys, office supplies).

Thus, the arrangement provides for multiple types of individually packaged products within the machine which allows provision of more types of products than could normally be achieved by vending machines based on separate cartridges or bins for each product type. The stacked storage arrangement maximizes the number of products which can be stored while providing access to any arbitrarily located product anywhere in the stack (referred to as "random access") as necessary.

The retrieval mechanism can comprise a lift mechanism configured for engaging a CSU and displacing it and a retrieving arrangement configured for locating, attachment to and retrieval of an item from a predetermined CSU. Specifically, the lift mechanism can be configured, when required to access a CSU, to engage the neighboring CSU directly above it, and lift it along with any other CSUs located thereon.

The lift mechanism can comprise a lift bar having anchor stubs projecting therefrom and configured for engaging a CSU in order to lift it. The lift bar can be configured for assuming a retracted position in which the anchor stubs are directed so that the retrieval system is free to travel along the CSUs; and a deployed position in which the lift bar is rotated so that the anchor stubs are engageable with the CSU allowing the lift mechanism to lift one or more stacked CSUs.

When several CSUs are stacked one on top of the other, and it is required to access a CSU(i), the lift mechanism can be configured for engaging CSU(i−1) located directly above CSU(i) and lifting it together with and other CSUs located thereon.

When lifting, said lift mechanism is configured for increasing the gap g to G so as to allow the retrieval system to access a predetermined compartment array. For this purpose, the vending machine can comprise a housing accommodating all the components thereof, and be designed so that there exists a gap space greater than G between an uppermost CSU and a top wall of the housing.

The retrieving mechanism can be constituted by a robotic arm pivotally attached to the retrieval system. The robotic arm can comprise a distal end fitted with an attachment member, configured for attaching to a desired item of the compartment array. The robotic arm can comprise a first arm and a second arm, pivotally attached to one another, so that a distal end of the second arm is capable of assuming any location along the CSU. According to one example, the attachment member can be a suction-cup.

The vending machine can further comprise a processing station and the retrieving system is configured for providing a retrieved item to said processing station. In addition, the vending machine can further comprise a delivery station configured for providing a prepared product from the processing station to a user of the machine.

In accordance with another aspect of the present application there is provided a method for operating a vending machine, said method comprising:

Receiving an input signal indicating a required item to be retrieved;

Identifying the location of the item within the compartment array based on the items map;

Bringing the retrieval system to the corresponding CSU and retrieving the item therefrom; and Delivering the item to a desired location within the vending machine.

Although not limited to such applications, the storage and random access arrangement of the above vending machine may prove advantageous in the context of beverage vending machines employing ingredients in capsules since the uniform size and shape of the products allows highly compact storage. Capsules may optionally be arranged sorted by tray (e.g., one tray per capsule type) or by sub regions of a tray set aside for a given capsule type. Locations of different types of capsules may be recorded in a map stored in a data storage medium of a computerized controller of the machine, allowing for random or arbitrary positioning of capsules, or sorting of the capsule positions according to any desired criteria. The computerized controller stores a map of where each product is currently located, typically in the form of a tray number and a position on the tray. While not in the process of actively dispensing, the system preferably consolidates products on fewer trays, making empty trays available to be removed and replaced with newly delivered full trays. The controller updates the maps of product locations dynamically during this process, tracking the position of each product.

The controller of the machine can also keep track of inventory and expiry dates. Excess unwanted items, or items approaching their expiry dates, may be transferred to the "empty" trays to be removed from the machine during the refilling procedure.

In addition, Positioning of products may be optimized for rapid access. For example, the controller may rearrange items during waiting periods between vending operations to ensure that at least one of each item, and/or a plurality of certain particularly popular items, are on a tray that is accessible in a "standby" state of the device, such as on a top tray, or on a given tray which is normally kept accessible.

The system can be used for many types of food products, and the entire cabinet may optionally be refrigerated. In certain cases, different items are processed differently, and may optionally be delivered to different processing stations. For example, the system may offer different proprietary capsules from different companies with different form-factors and requiring different processing units. As a further example, the system may have a coffee station for processing ground coffee capsules, a powdered hot-beverage station for dissolving powders from a capsule for generating a hot drink, and a juice station for reconstituting cold juice from a concentrate capsule. Devices for performing each of these individual functions are commercially available and will not be described here in detail. In each case, the controller receives a dispensing request for a given product, retrieves from memory a location (tray and position) of a corresponding item, activates the robotic system to retrieve the item and deliver it to the corresponding processing station, and actuates the corresponding processing components to produce the required product. The product is then brought to a dispensing location accessible to the customer, which may advantageously be common to the different dispensing technologies.

Although many of the above examples refer to items requiring processing prior to dispensing, it should be noted that the systems of the present invention may also be used to advantage with many other types of products, particularly where there is a demand for multiple types or flavors of products. Additional non-limiting exemplary applications include ice creams, yoghurts and other dairy products, in which it is common to have multiple flavors, brands and/or levels of fat content.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIGS. 5B to 5L are schematic front and isometric views demonstrating various steps of operation of the vending machine shown in FIGS. 1A to 2D;

DETAILED DESCRIPTION OF EMBODIMENTS

Figure 1A:
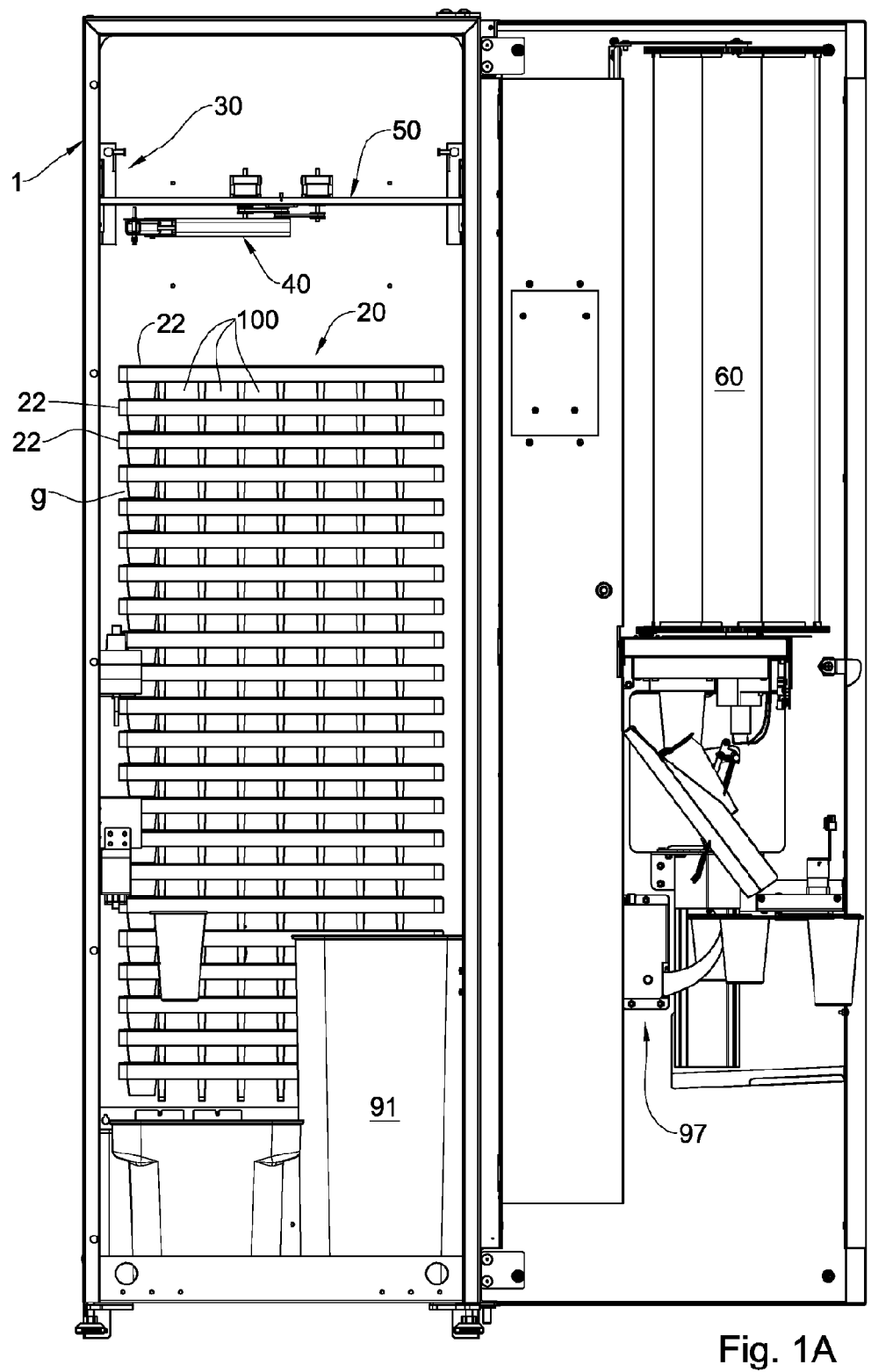
FIG. 1A is a schematic front view of the vending machine according to the presently disclosed subject matter.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "receiving", "authenticating", "retrieving", "dispensing", "updating", "transferring", "verifying", "providing" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), a computing module containing any combination of the above, any other electronic computing device, and or any combination thereof.

The operations in accordance with the teachings herein may be performed by a computer specially constructed for the desired purposes or by a general purpose computer specially configured for the desired purpose by a computer program stored in a non-transitory computer readable storage medium.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 7:
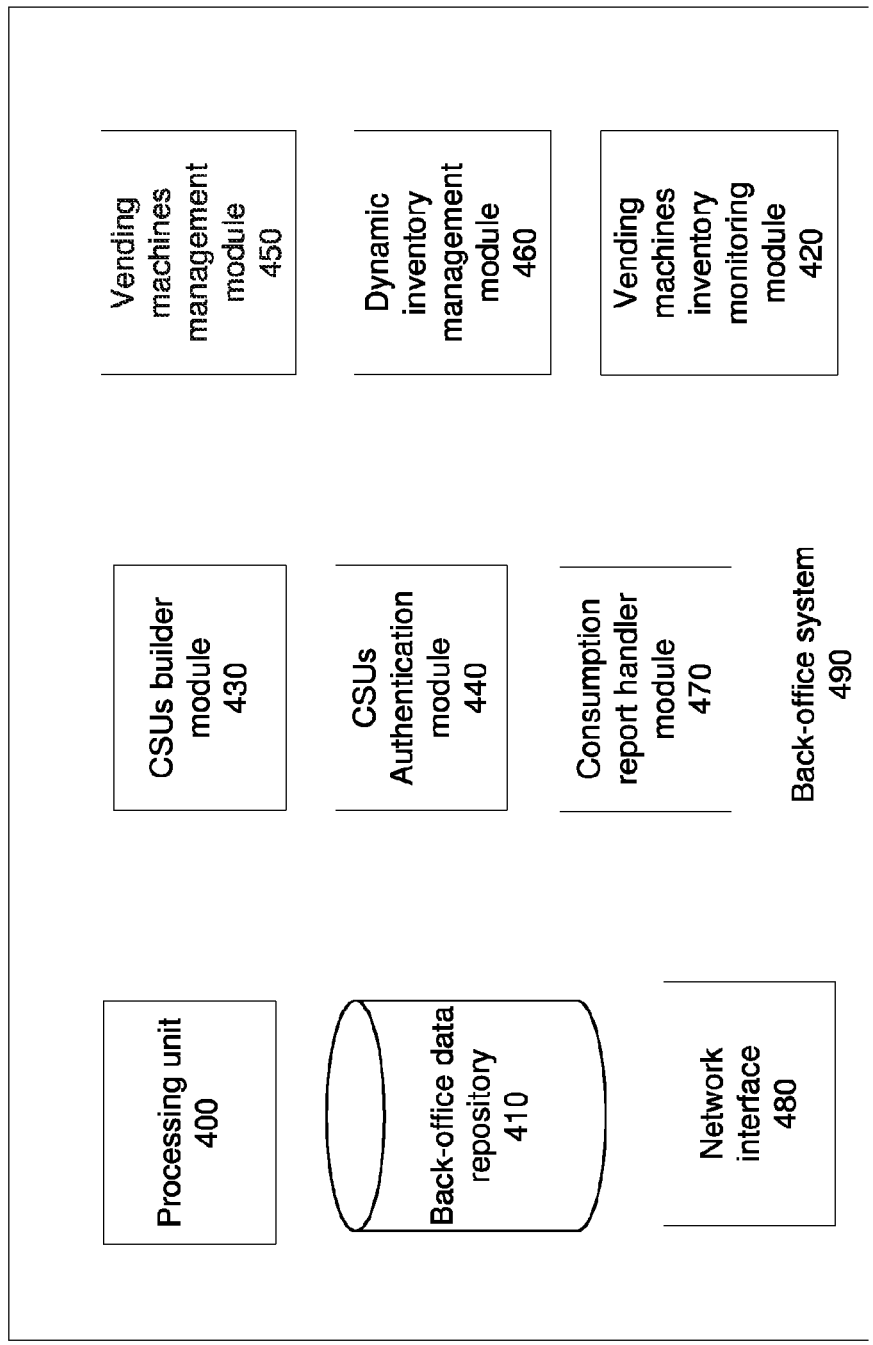
FIG. 7 is a schematic functional block diagram of a back-office system according to certain examples of the presently disclosed subject matter.
Figure 8:
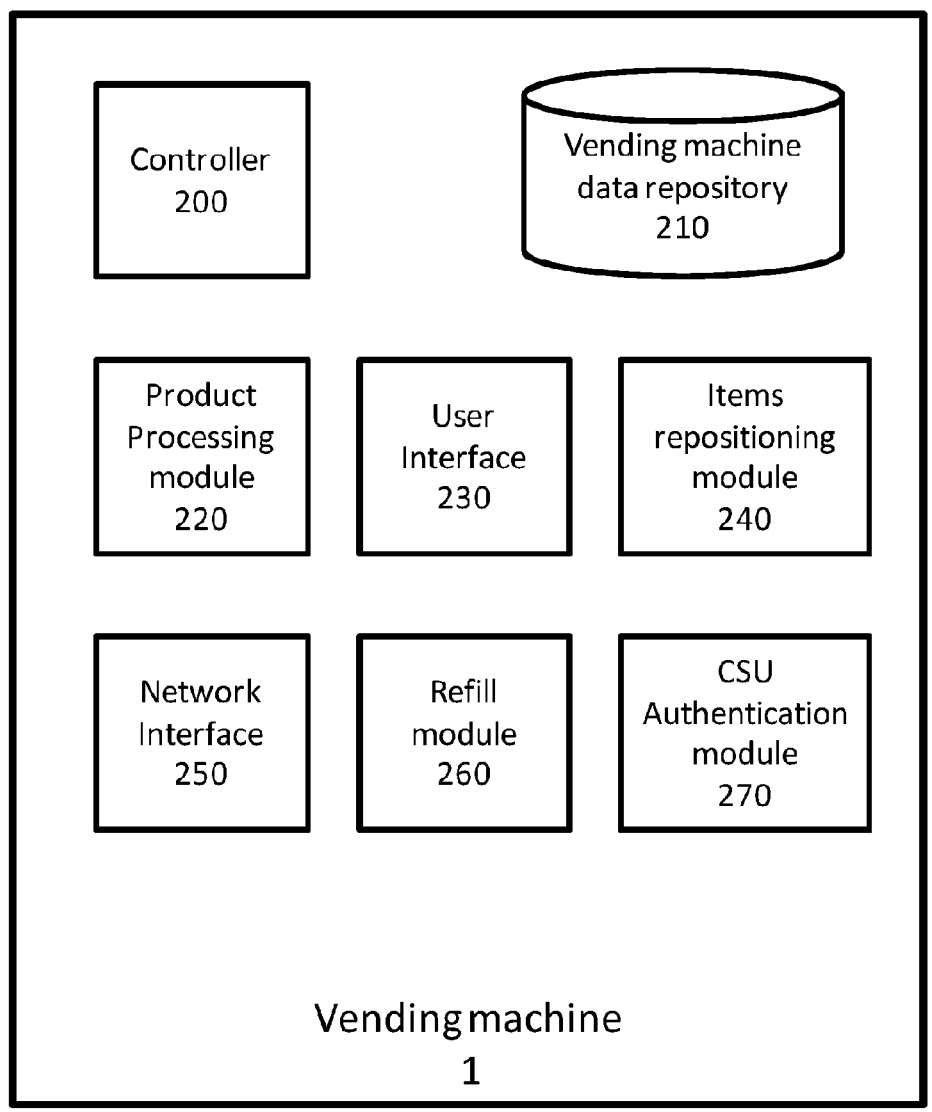
FIG. 8 is a schematic functional block diagram of a vending machine according to certain examples of the presently disclosed subject matter.

In embodiments of the presently disclosed subject matter, fewer, more and/or different stages than those shown in FIG. 9, 11-13 may be executed. In embodiments of the presently disclosed subject matter one or more stages illustrated in FIG. 9, 11-13 may be executed in a different order and/or one or more groups of stages may be executed simultaneously. FIGS. 7 and 8 illustrate a general schematic of the system architecture in accordance with an embodiment of the presently disclosed subject matter. Each module in FIGS. 7 and 8 can be made up of any combination of software, hardware and/or firmware that performs the functions as defined and explained herein. The modules in FIGS. 7 and 8 may be centralized in one location or dispersed over more than one location. In other embodiments of the presently disclosed subject matter, the system may comprise fewer, more, and/or different modules than those shown in FIGS. 7 and 8.

Figure 1B:
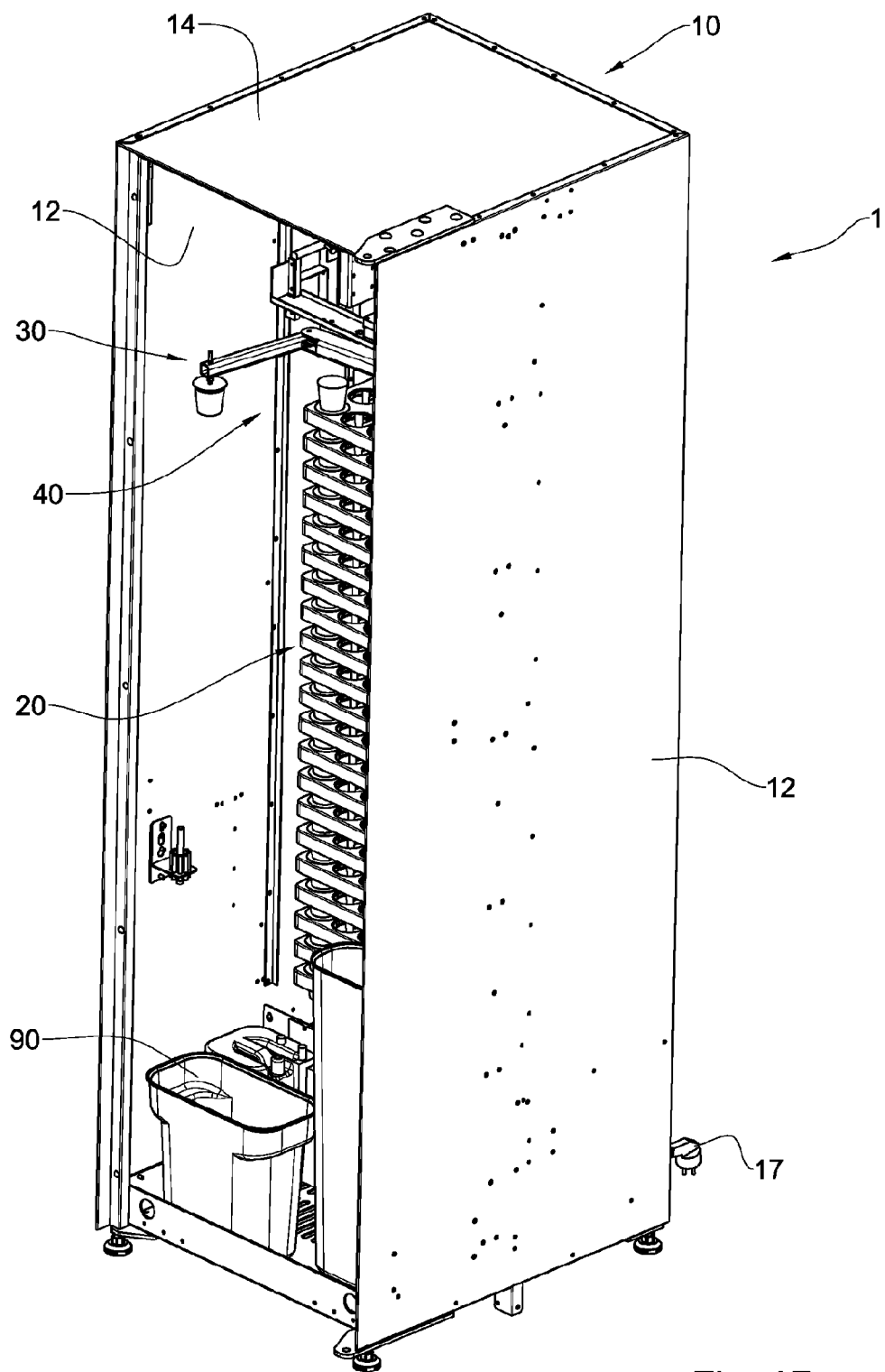
FIGS. 1B and 1C are schematic isometric and front views of the vending machine shown in FIGS. 1A to 1C, with the front door thereof being removed.
Figure 1C:
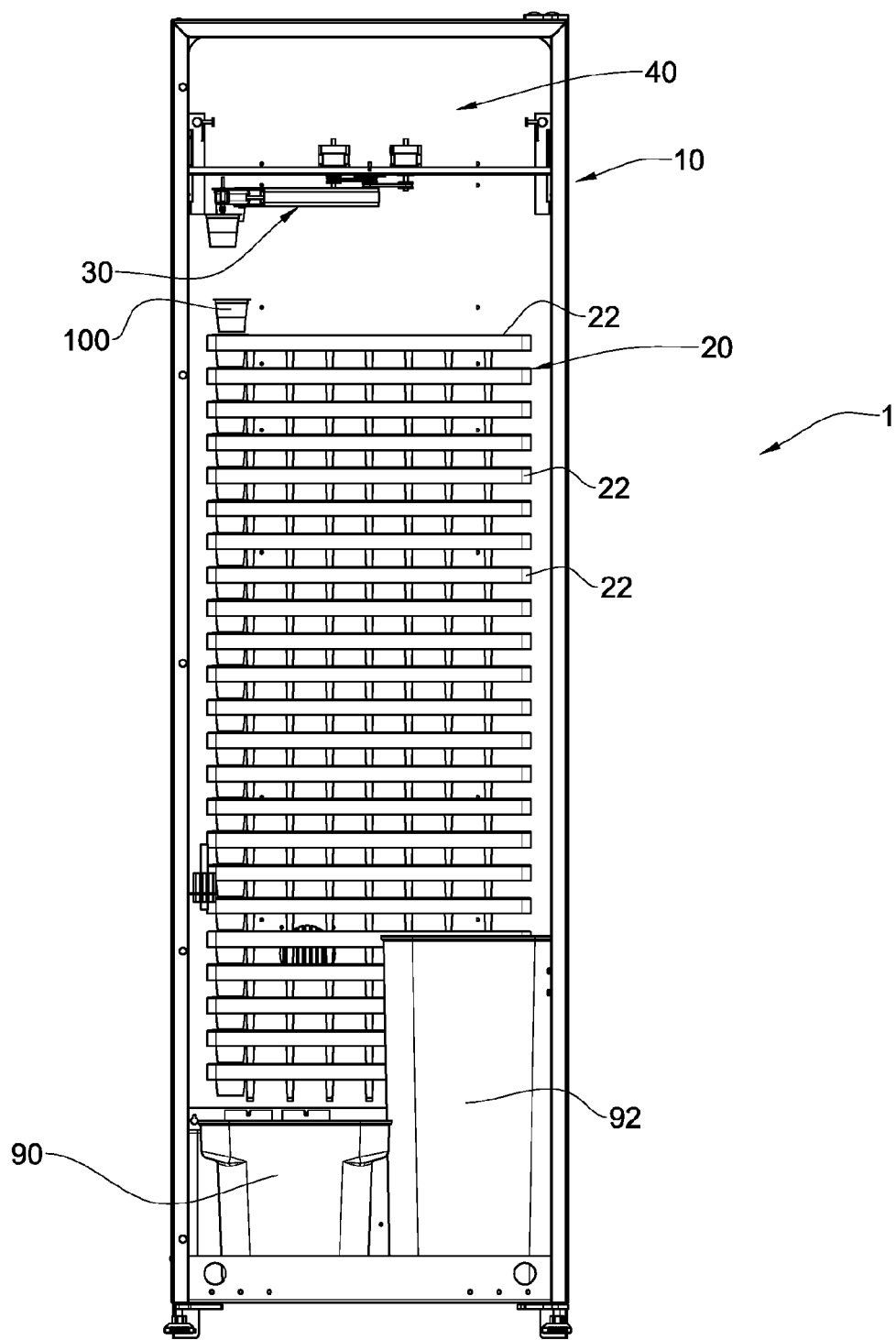
Figure 2A:
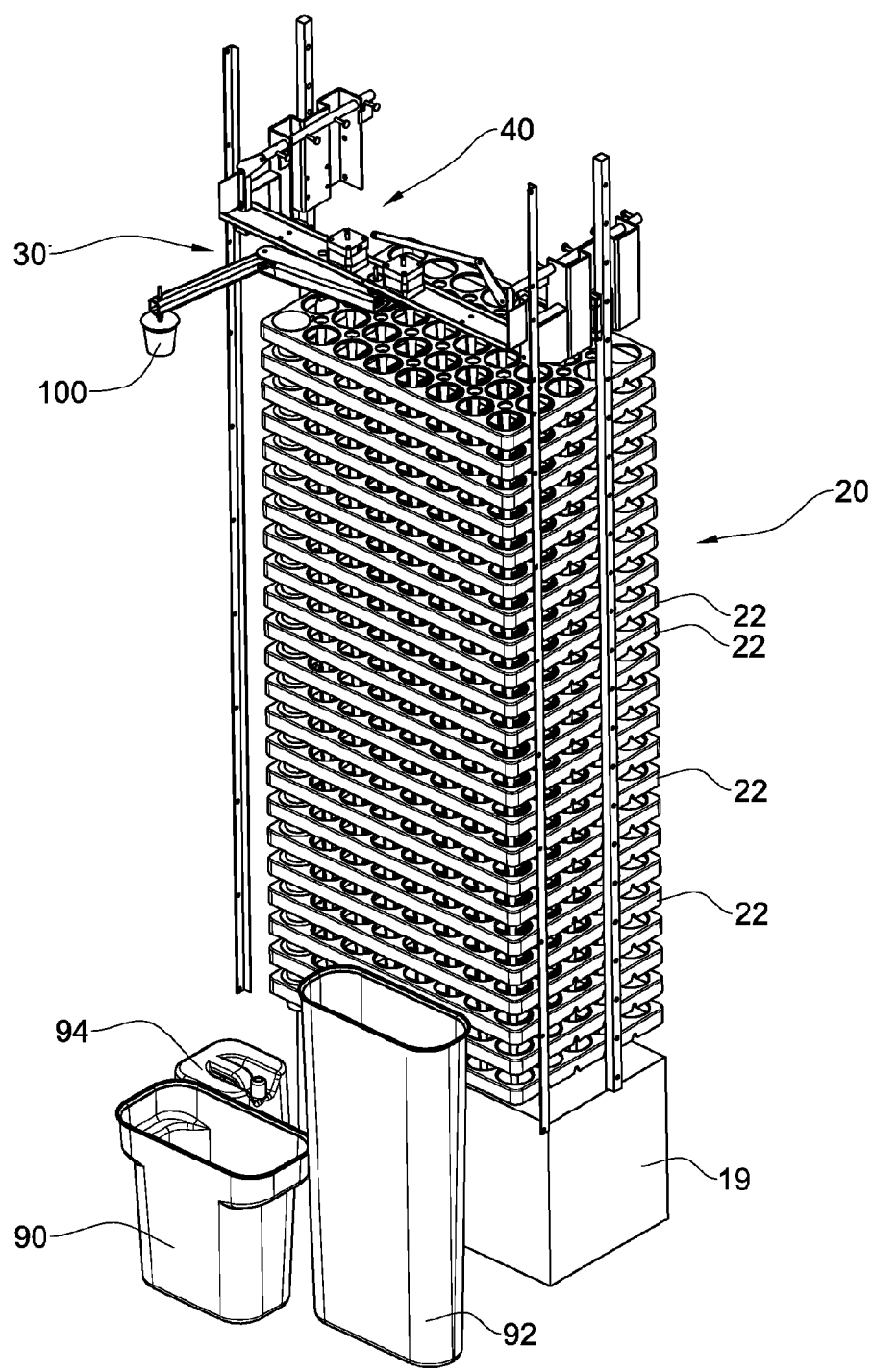
FIG. 2A is a schematic isometric view of the internal mechanism of the vending machine shown in FIGS. 1A to 1C, with the housing being removed.
Figure 2B:
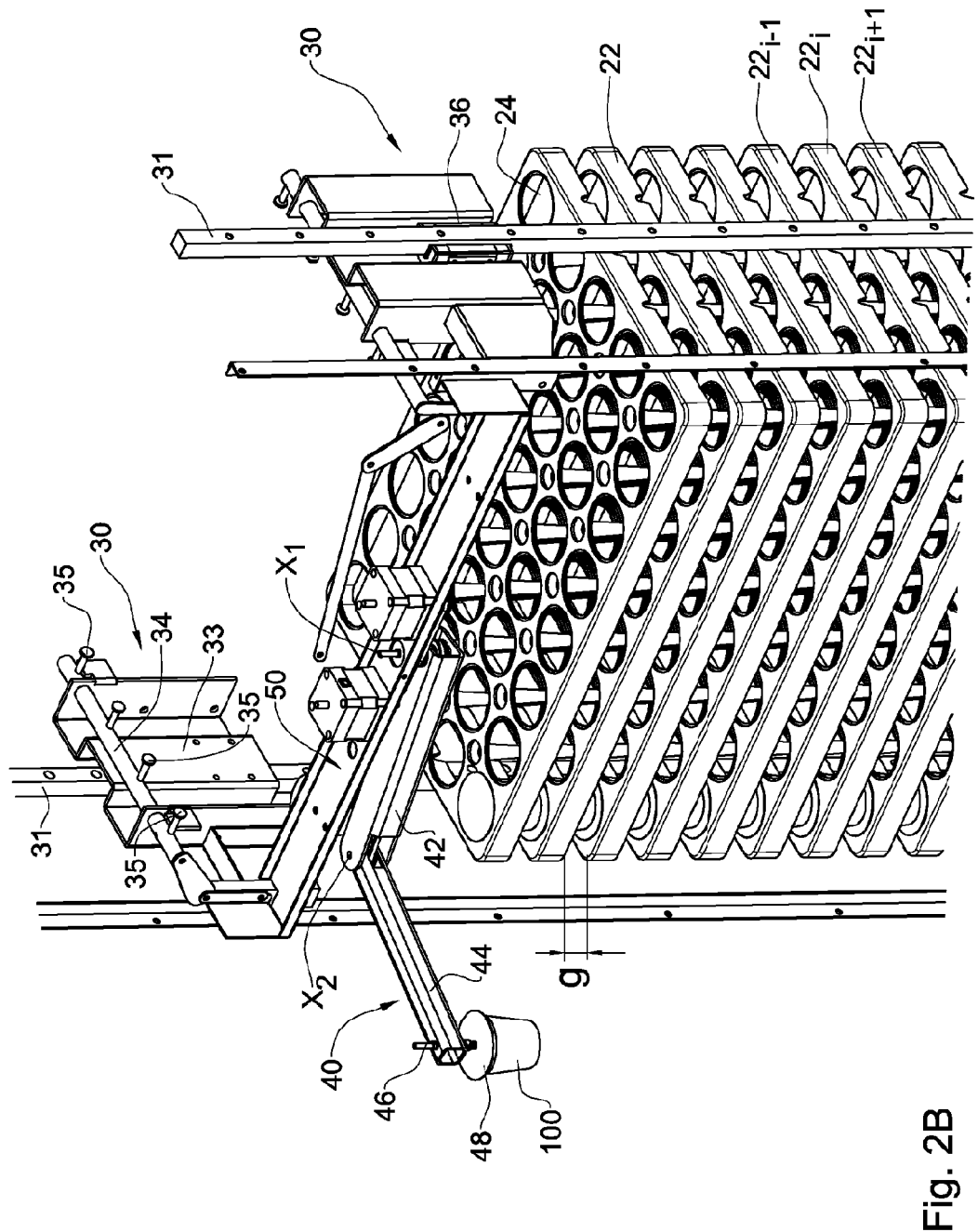
FIG. 2B is a schematic enlarged view of a detail shown in FIG. 2A.
Figure 2C:
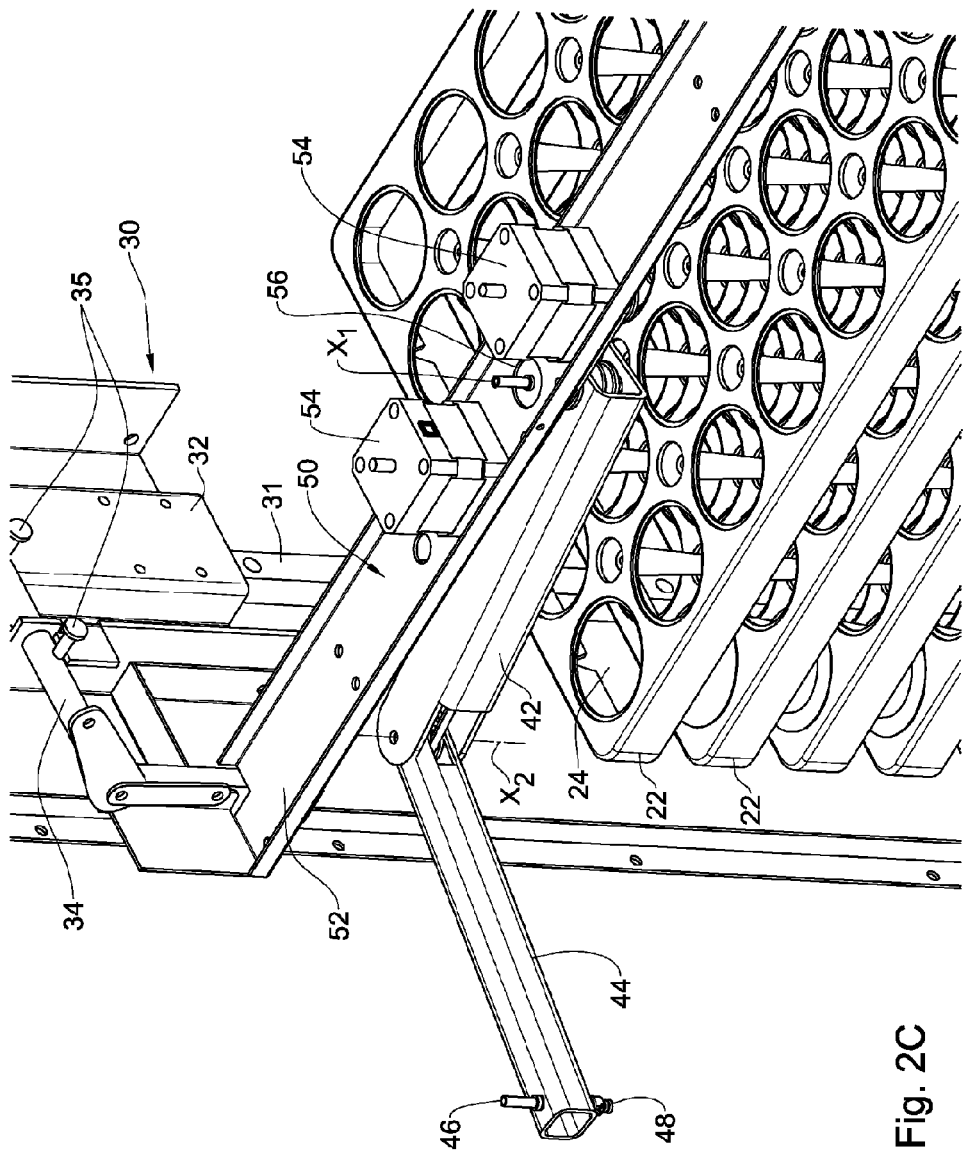
FIG. 2C is a schematic enlarged view of a detail shown in FIG. 2B showing a robotic arm used in the vending machine.
Figure 2D:
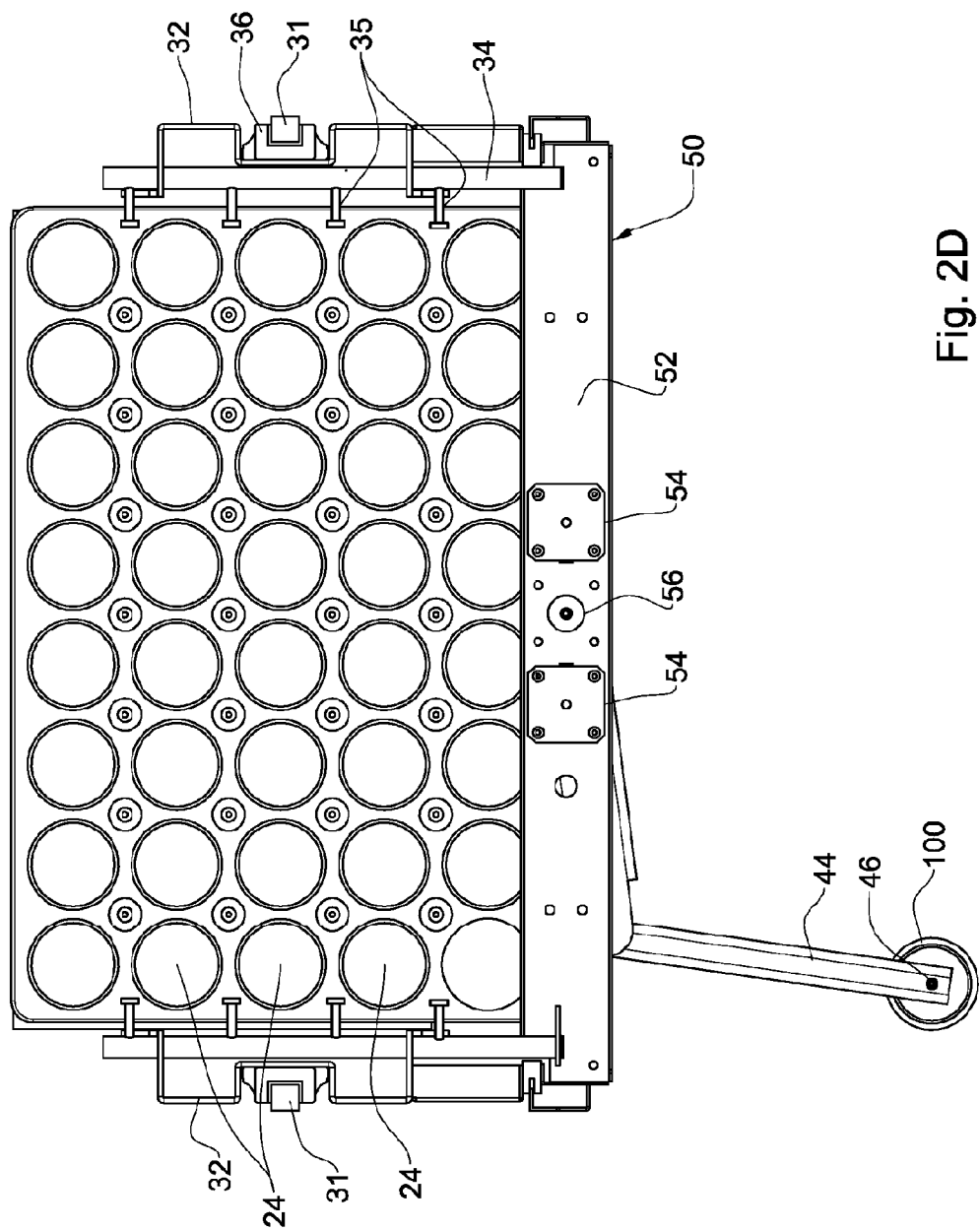
FIG. 2D is a schematic top view of the vending machine shown in FIG. 2A.
Figure 3:
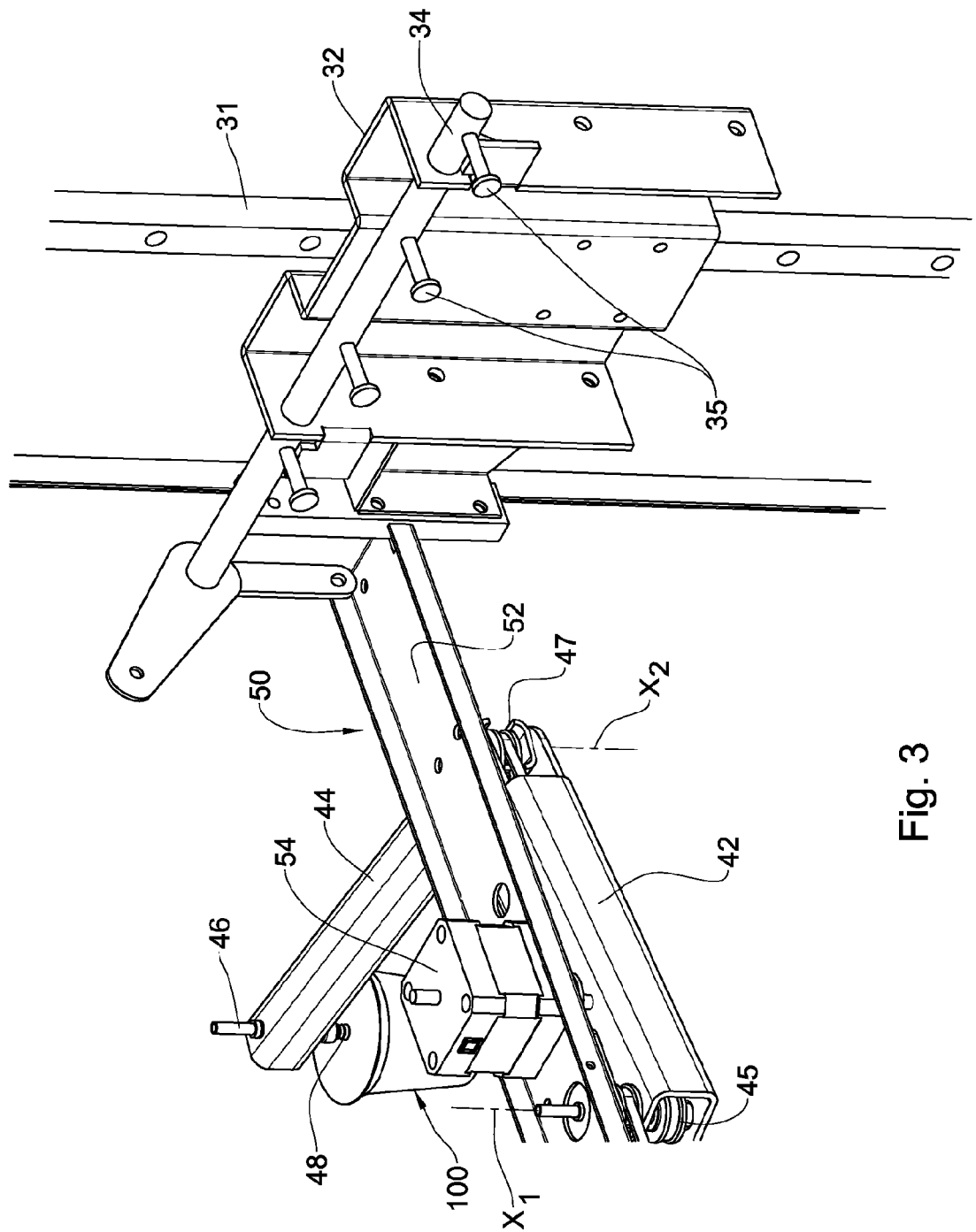
FIG. 3 is a schematic isometric view of a lifting mechanism employed in the vending machine shown in FIGS. 1A to 2D.

Bearing this in mind, attention is first drawn to FIGS. 1A to 1C, in which a vending machine for the provision of drinks/beverages is shown, generally being designated as 1. The vending machine 1 is configured for storing an assortment of items for the preparation of a variety of both hot and cold beverages and for their provision to a user.

The vending machine comprises a housing 10 accommodating an item storage in the form of a tray system 20, a retrieval system RS comprising a lift mechanism 30, a robotic retrieving arrangement 40 and a bridge unit 50, a drink/beverages processing station 70 and a control module comprising a controller 200 configured for controlling the operation of the vending machine 1. The vending machine 1 further comprises a power unit 19 and a corresponding power cord 17.

As is customary in vending machines, the housing 10 comprises surrounding walls 12, 14 and is provided with a door 16 which is configured for remaining closed during operation of the vending machine 1 yet can be opened to allow an operator with access for the purpose of maintenance etc.

As is shown in FIGS. 1A to 1C, the door 16 comprises therein an interface unit for allowing a user to operate the machine 1 and perform an order of a desired item, a disposable container storage 91 configured for accommodating a plurality of disposable cups and a delivery arrangement 97 configured for delivering the prepared beverage from inside the housing 10 to the user when prepared.

Turning now to FIGS. 2A to 2D, the tray system 20 is shown comprising a plurality of storage trays, each constituting a Compartmentalized Storage Unit (CSU) 22, arranged in a stacked manner along the majority of the height of the vending machine 1.

It is important to observe that in the position shown in FIGS. 2A to 2D, the CSUs 22 are closely stacked on one another, leaving a relatively minor gap g between each two neighboring CSUs. As will be apparent from the structural features and operation of the vending machine 1, this closely stacked arrangement is made possible by a unique design of the retrieval system RS and allows loading of the vending machine with a considerably high number of items/goods.

It is noted that for a predetermined CSU 22, indicated 22i, two neighboring CSUs can be defined: CSU 22i−1 located directly above the CSU 22i, and a CSU 22i+1 located directly below the CSU 22i. As will be explained in detail later, the controller 200 is programmed to know the position of each of the CSUs, and can accurately direct the retrieval system RS to one CSU or another.

Figure 4A:
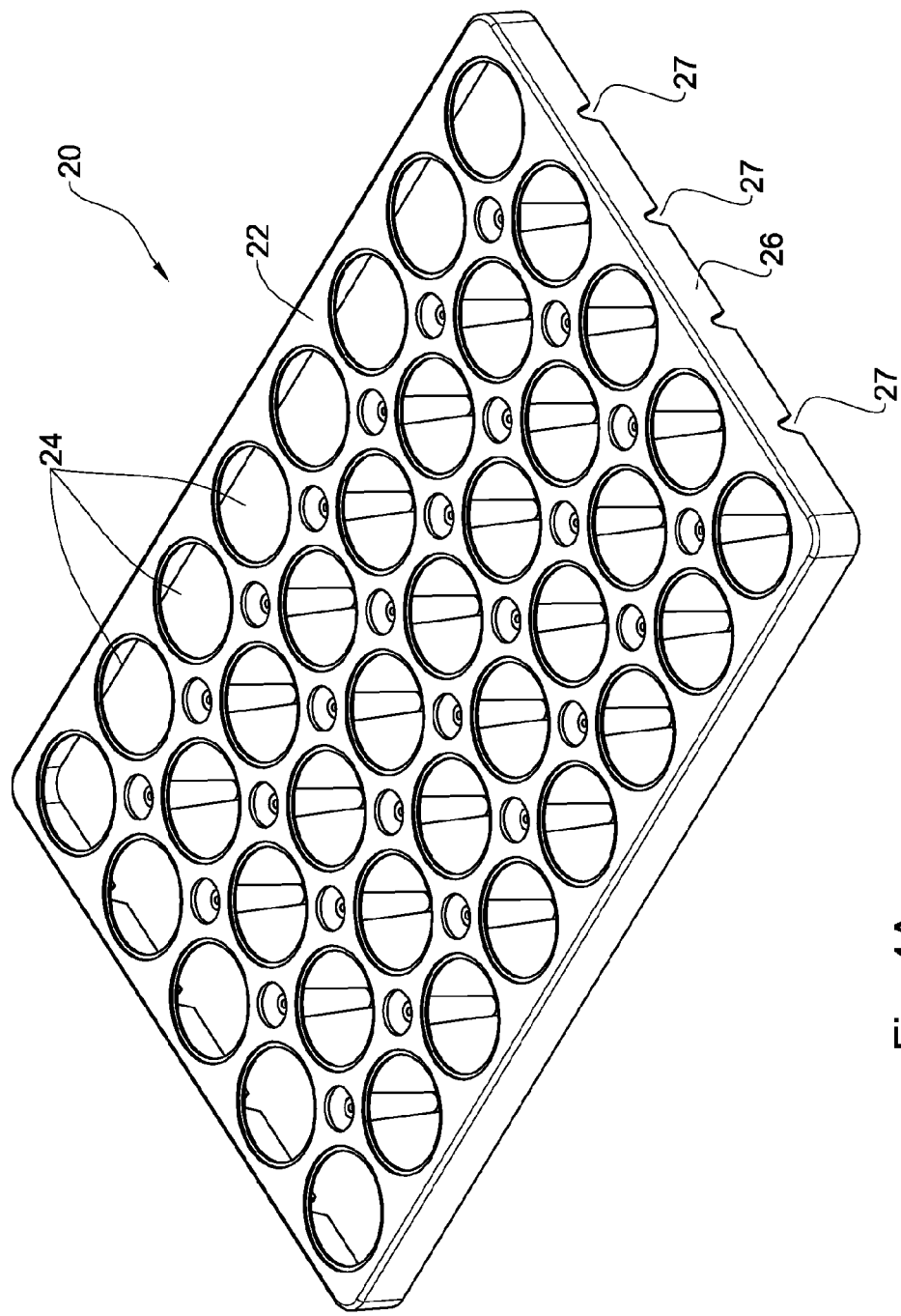
FIGS. 4A and 4B are schematic top and bottom isometric views of a CSU used in the vending machine shown in FIGS. 1A to 2D.
Figure 4B:
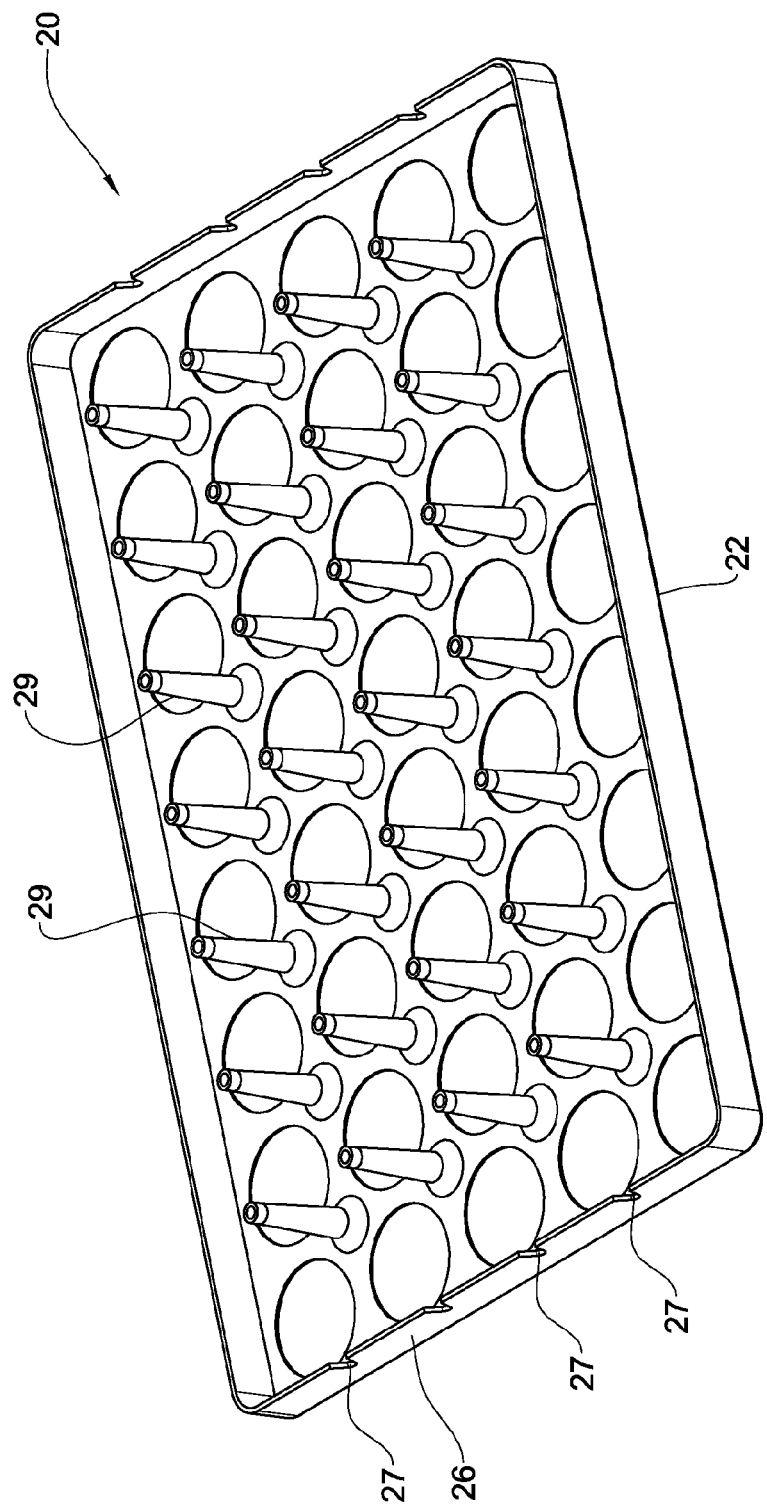
Figure 4C:
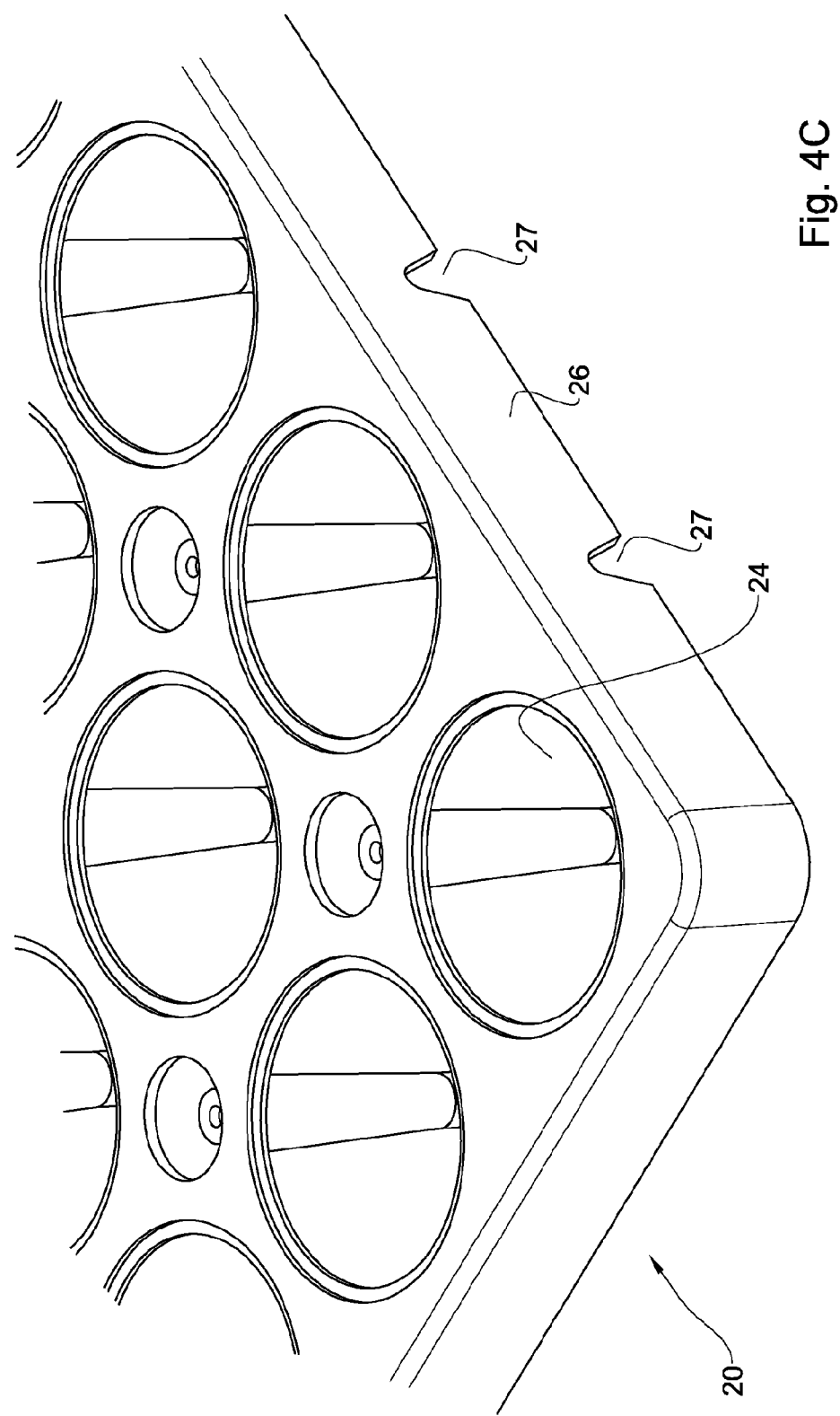
FIG. 4C is a schematic enlarged view of a detail of the CSU shown in FIGS. 4A and 4B.

With additional reference being made to FIGS. 4A to 4C, each CSU 22 is constituted by a tray formed with a plurality of perforations, defining compartments 24 configured for selectively accommodating therein a plurality of items, e.g. capsules. The CSUs can be made of any suitable material (plastic/metal/paper), so long as it is sufficiently structurally rigid in order to support the weight of the items accommodated within the compartments 24.

In addition, the CSU 22 has a surrounding side rim 26, wherein, in two opposite walls of the side rims 26, lift recesses 27 are formed, configured for engagement with the lift mechanism 30, as will be described later with respect to FIGS. 5A to 5L and the steps of operation of the vending machine 1.

The CSU 22 further comprises a plurality of spacer elements 29 extending from the bottom of the CSU 22 and configured for providing spacing between the CSU 22 and a neighboring CSU on which it is positioned, as well as for support thereof. In particular, since the compartments of each CSU are configured for accommodating an item 100, it is desired that the weight of one CSU 22 does not rest on the items 100 of a CSU 22 located directly below it. The spacer elements 29 allow supporting the CSU 22 while preventing such load from being exerted on the items 100.

Reverting now to FIGS. 2A to 2D, within the housing 10 there are provided longitudinal rails 31 extending along the height of the vending machine 1 at opposite sides of the housing 10. The rails 31 are configured for supporting the retrieval system RS, and, in particular, for providing a track along which the retrieval system RS can displace (in this case—vertically).

The lift mechanism 30 comprises two similar units, each in engagement with an opposing rail 31, and each comprising a main body 32 having articulated thereto, along a direction perpendicular to the rail 31, a lift bar 34 configured for engagement with a CSU 22. In particular, each lift bar 34 comprises a plurality of anchor stubs 35 projecting therefrom and configured for selectively supporting a desired CSU during operation of the retrieval system RS.

The lift bar 34 is configured for being selectively rotatable about its longitudinal axis so as to assume at least two positions:

- a retracted position (shown FIG. 5I) in which the anchor stubs 35 are directed along the vertical height of the housing 10 in which the retrieval system RS is free to travel vertically along the rails 31 and tray system 20 in order to be brought into position in front of a desired CSU 22; and
- a deployed position in which the lift bar is rotated 90° so that the anchor stubs 35 are directed towards the tray system 20, allowing the lift mechanism 30 to lift one or more stacked CSUs in order to provide access to a desired CSU.

The retrieval system RS is further provided with a bridge unit 50 adjoining the two lift mechanism units 32 and configured for pivotally supporting the robotic retrieving arrangement 40 via a joint 56. The bridge unit 50 further supports two units 54. The arrangement is such that the retrieval system RS including the lift mechanism 30, robotic retrieval arrangement 40 and the bridge unit 50 is configured for travelling along the rails 31 as a single body.

The robotic retrieval arrangement 40 is in the form of a robotic arm comprising a first arm 42 pivotally articulated to the bridge 52 of the bridge unit via the pivotal joint 56 and a second arm 44 pivotally articulate to the first arm 42 via an auxiliary pivot joint 47. A distal end of the second arm 44 is provided with a utility arm 46 having a suction unit 48, configured for selective attachment to a desired item 100 located in a desired CSU 22.

The length of each of the arms 42, 44 and the position of the pivot joint 56 are configured so that a distal end of the second arm 44 is free to displace, owing to two degrees of freedom, along a plane perpendicular to the vertical axis of the housing 10, in order to reach any desired point along a desired CSU 22.

Turning now to FIGS. 5A to 5L, the steps of operation of the vending machine 1 will now be described in detail. The steps of the operation described below refer to the operation of the vending machine 1 taking place after a user of the machine 1 placed an order, for example, ordering vanilla cappuccino coffee.

Once an order is placed, the controller 200 identifies the location of the relevant item 100, i.e. in which CSU it is located (e.g. CSU 22i), and, within the CSU 22i, in which of the compartments 24 the item 100 is located. Once determining the location, the controller 200 can now indicate to the retrieval system RS to approach the relevant CSU.

At the first stage, the entire retrieval system RS is displaced vertically to face the relevant CSU 22i. It is observed that during this displacement, the anchor stubs 35 are directed upwards (see FIG. 5B) so as to allow displacement of the retrieval system RS.

Upon approaching the relevant position just below CSU 22i (see FIG. 5C), the anchor stubs 35 are deployed to their deployed position in order to allow the lift mechanism 30 to lift the CSU 22i and any CSUs stacked on it (i.e. CSU 22i−1, 22i−2 etc.).

Figure 5A:
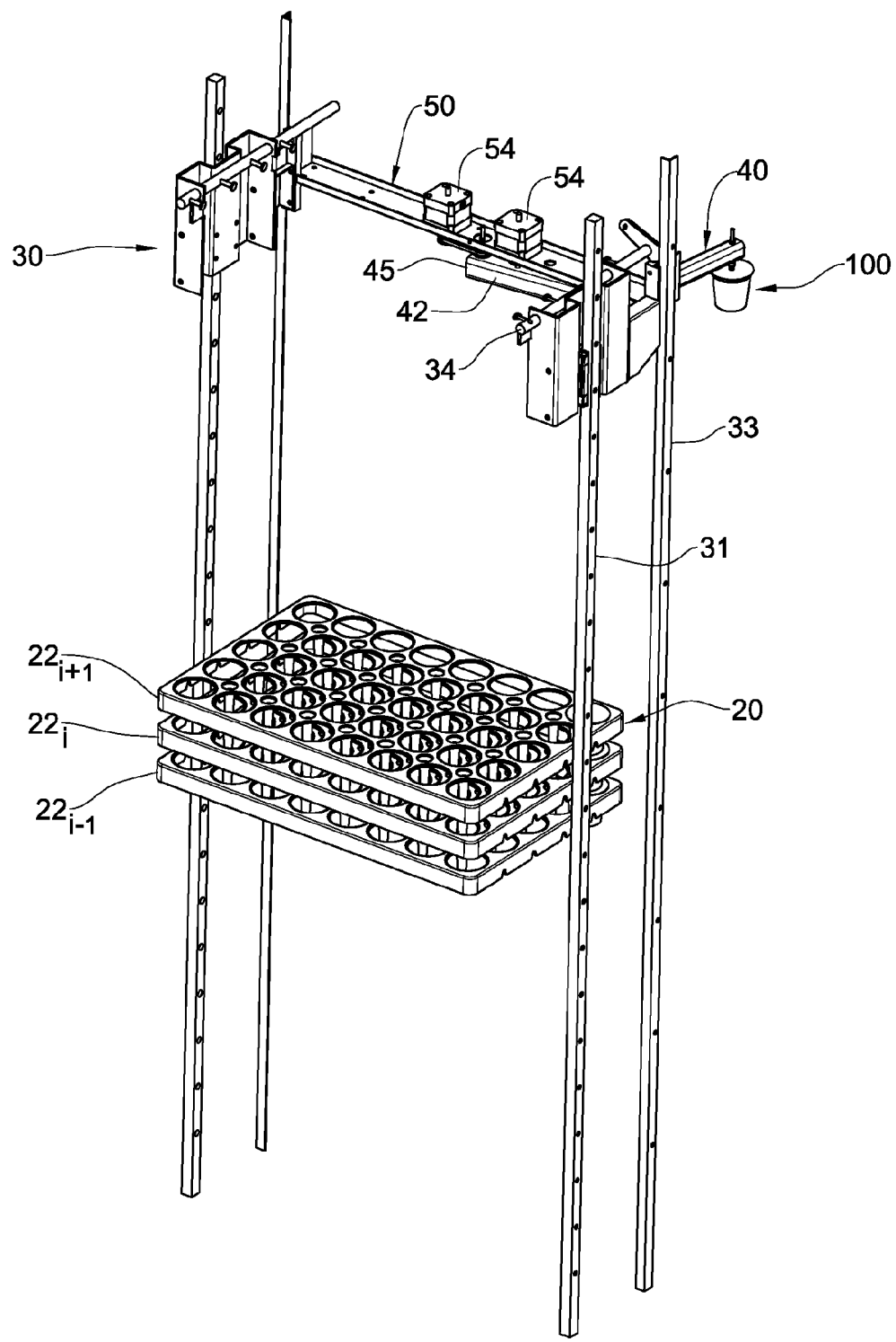
FIG. 5A is a schematic isometric view of exemplary CSUs of the vending machine shown in FIGS. 1A to 2D.
Figure 5B:
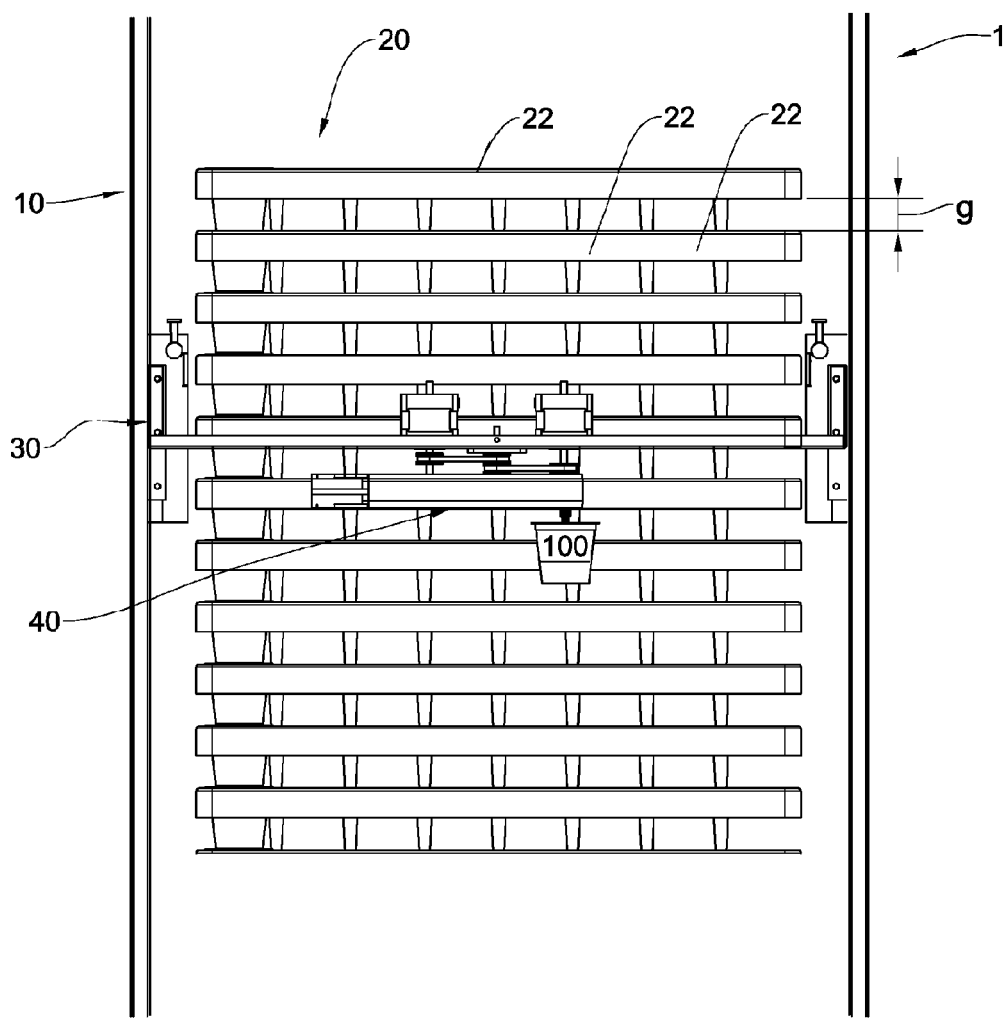
Figure 5C:
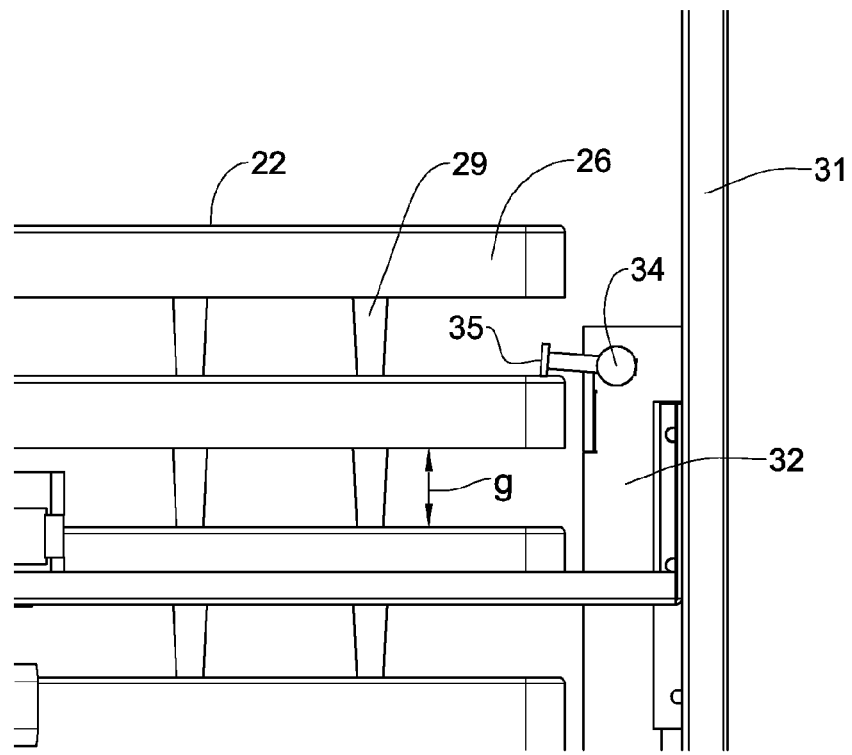

In the position shown in FIG. 5C, the following is noted:
- the robotic retrieving arrangement 40 is not aligned with the CSU 22i;
- even were it aligned, the gap g between two neighboring CSUs 22 is simply too small allow the robotic arm to retrieve an item 100 therefrom; and
- even if the gap g was sufficient for allowing entrance of the robotic arm, it is still smaller than the height of the item 100 (in this case—a capsule).

In connection with the above, the closely stacked arrangement of the CSUs 22 thus allows for stacking a greater number of CSUs within the housing 10 of a vending machine 1, proving an advantage. However, it should be appreciated that other examples and designs can be provided in which the CSUs 22 are stacked or positioned so as to allow the robotic retrieving arrangement 40 to retrieve an item 100 even without lifting/displacing the CSUs.

Figure 5D:
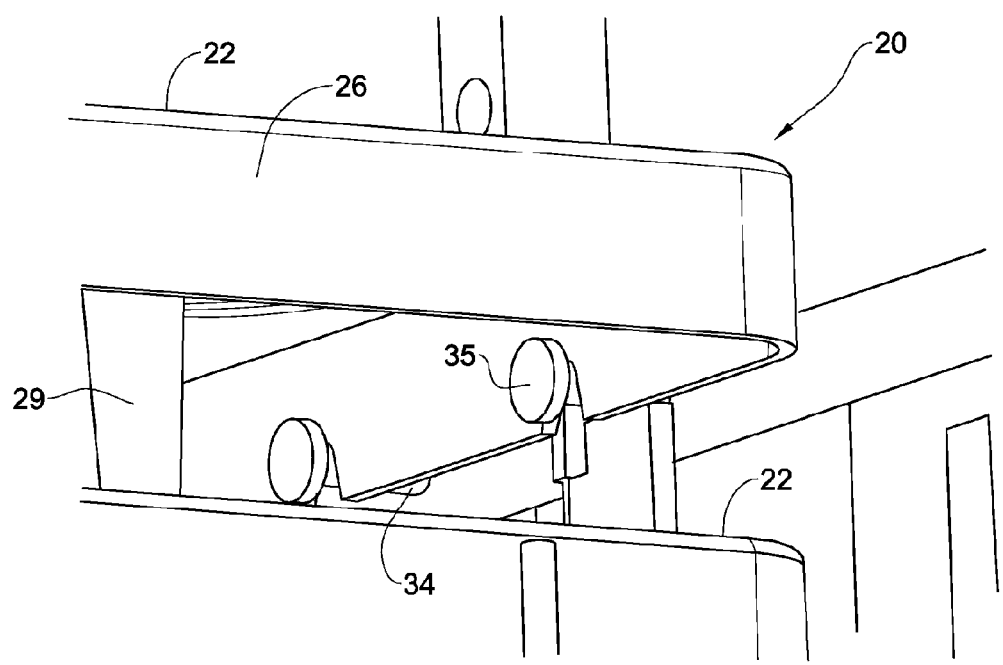

With particular reference being now made to FIG. 5D, when the anchor stubs 35 are in the deployed position, the entire retrieval system RS is displaced upwards, causing the stubs 35 to engage the lift recesses 27 of the CSU 22*i*, so that when the retrieval system RS travels further upwards, it lifts the CSU 22*i* and all the other CSUs 22 stacked above it.

When the CSUs have been lifted to a sufficient amount (see FIG. 5G), an access gap G is formed between the CSU 22*i* and the CSU 22*i*+1, allowing the robotic retrieving arrangement 40 with sufficient space to access the desired item 100. It is important to note that the design of the tray system 20 and the housing 10 is such that the latter if provided with sufficient head space in order to allow lifting of the CSUs 22 by an amount G–g.

Figure 5E:
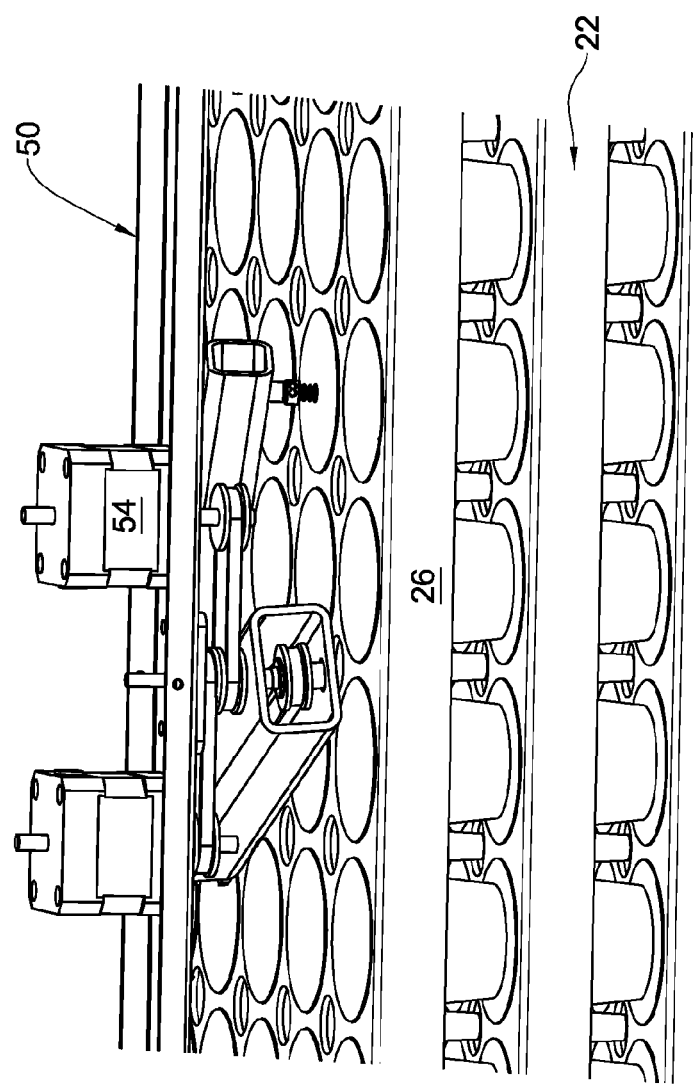
Figure 5F:
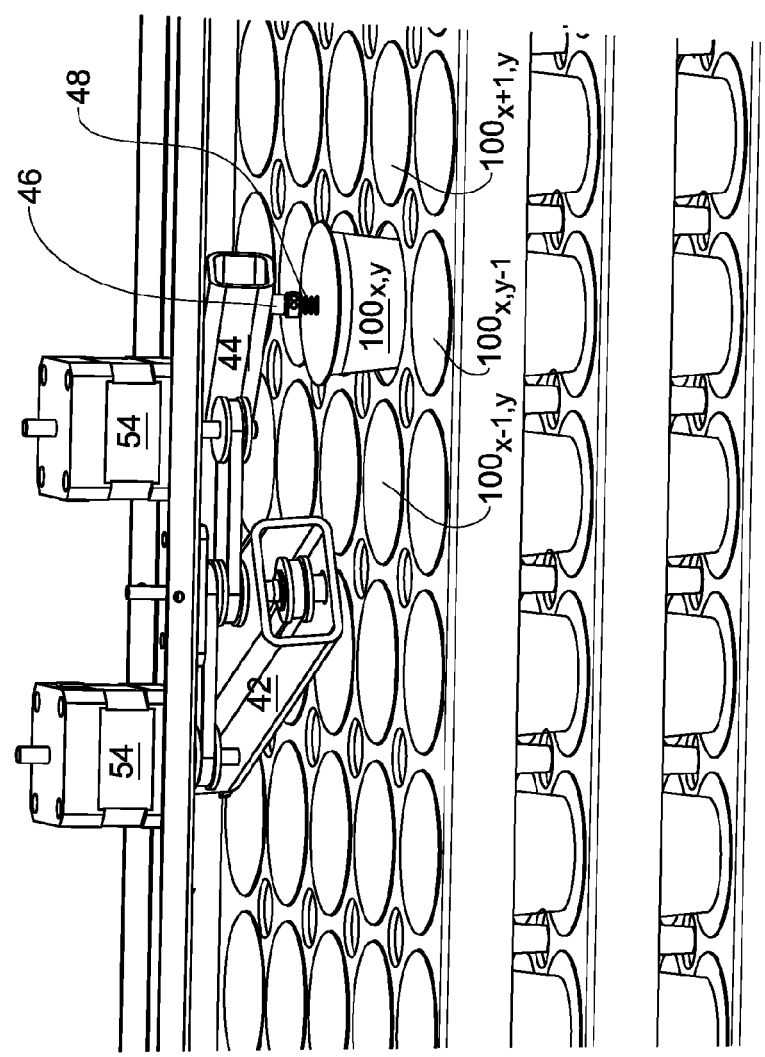
Figure 5G:
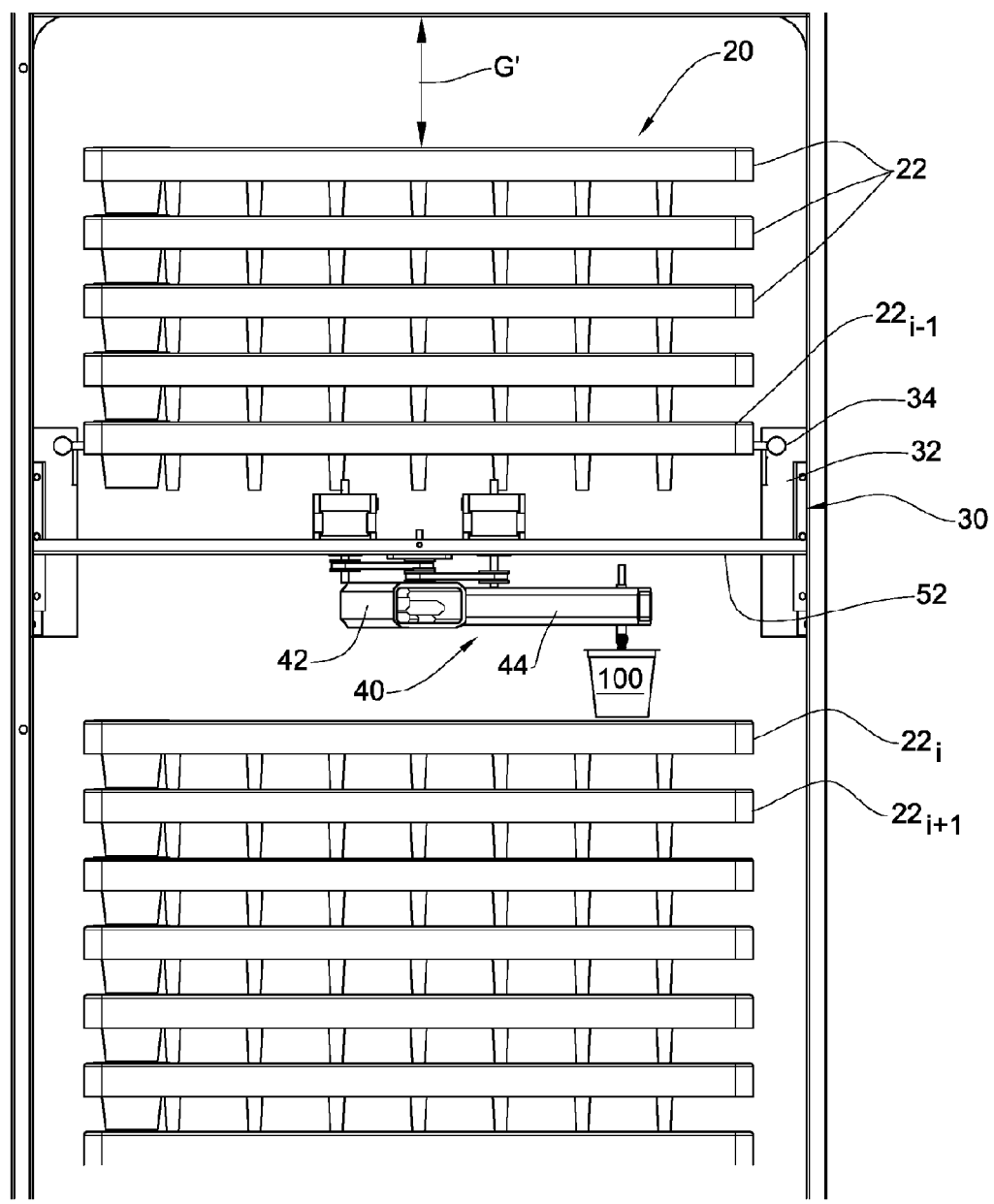

Turning now to FIGS. 5E and 5F, once the CSUs 22*i* and up have been sufficiently lifted and separated from the CSUs 22*i*+1 and down, the controller promotes the robotic arms 42, 44 to enter the space G between the CSUs 22*i*, 22*i*+1 so as to bring the suction unit 48 into a desired position over the required item 100.

Once brought into position, the suction unit 48 attaches itself to the top of the item 100 and lifts it out of the compartment 24 (see FIG. 5F), and thereafter, when being completely removed from the compartment 24, removes it from between the CSUs 22*i*, 22*i*+1. After being removed, the entire retrieval system RS can be displaced back downwards so as to replace the CSUs 22*i*−1 and up onto the CSU 22*i*.

Figure 5H:
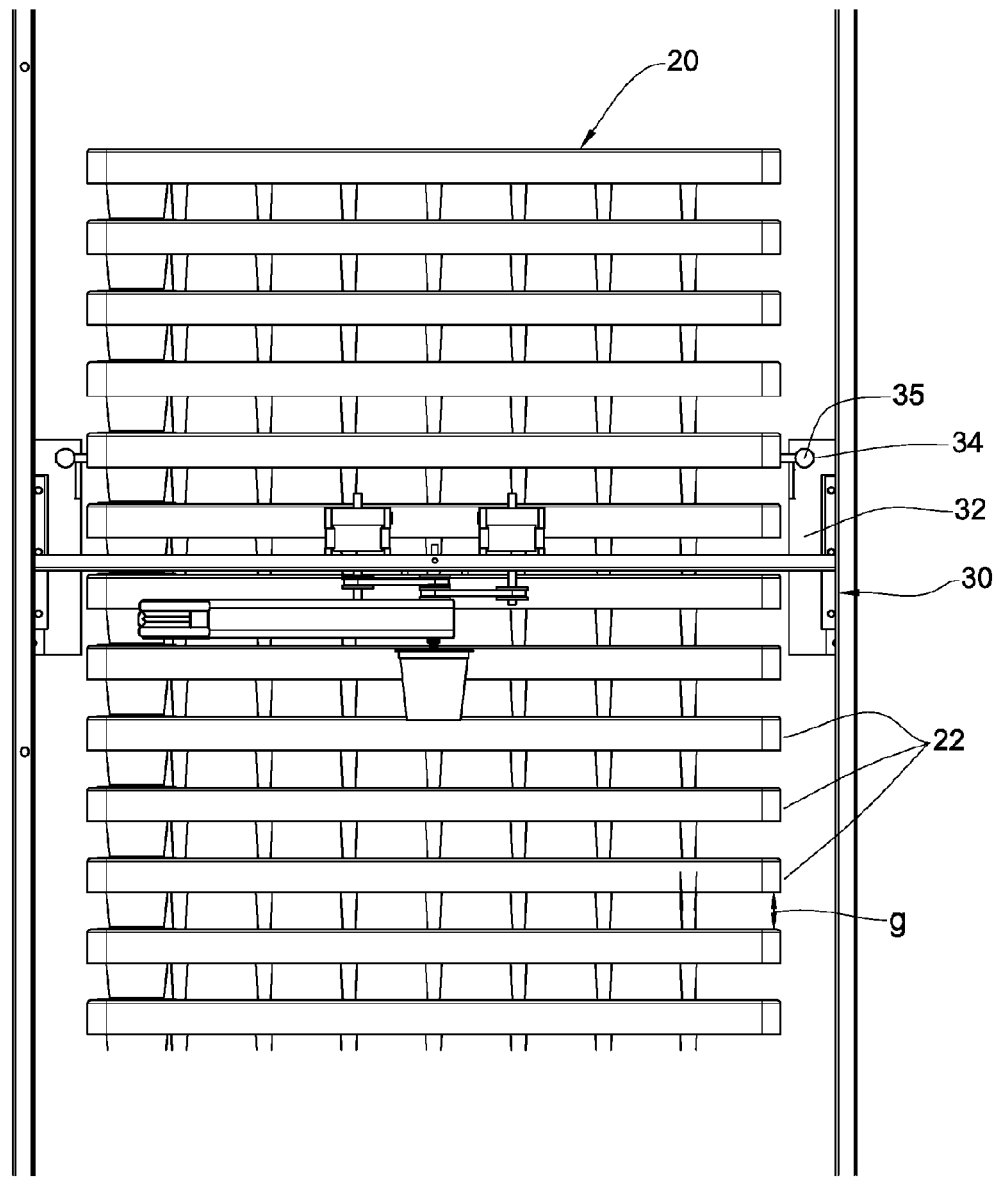
Figure 5I:
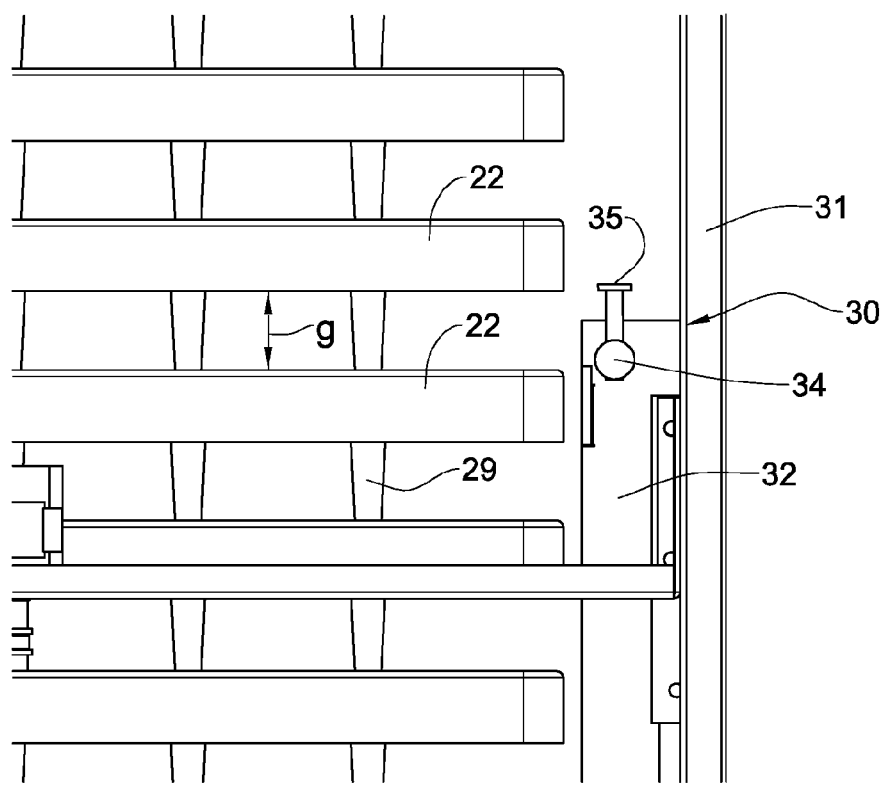
Figure 5J:
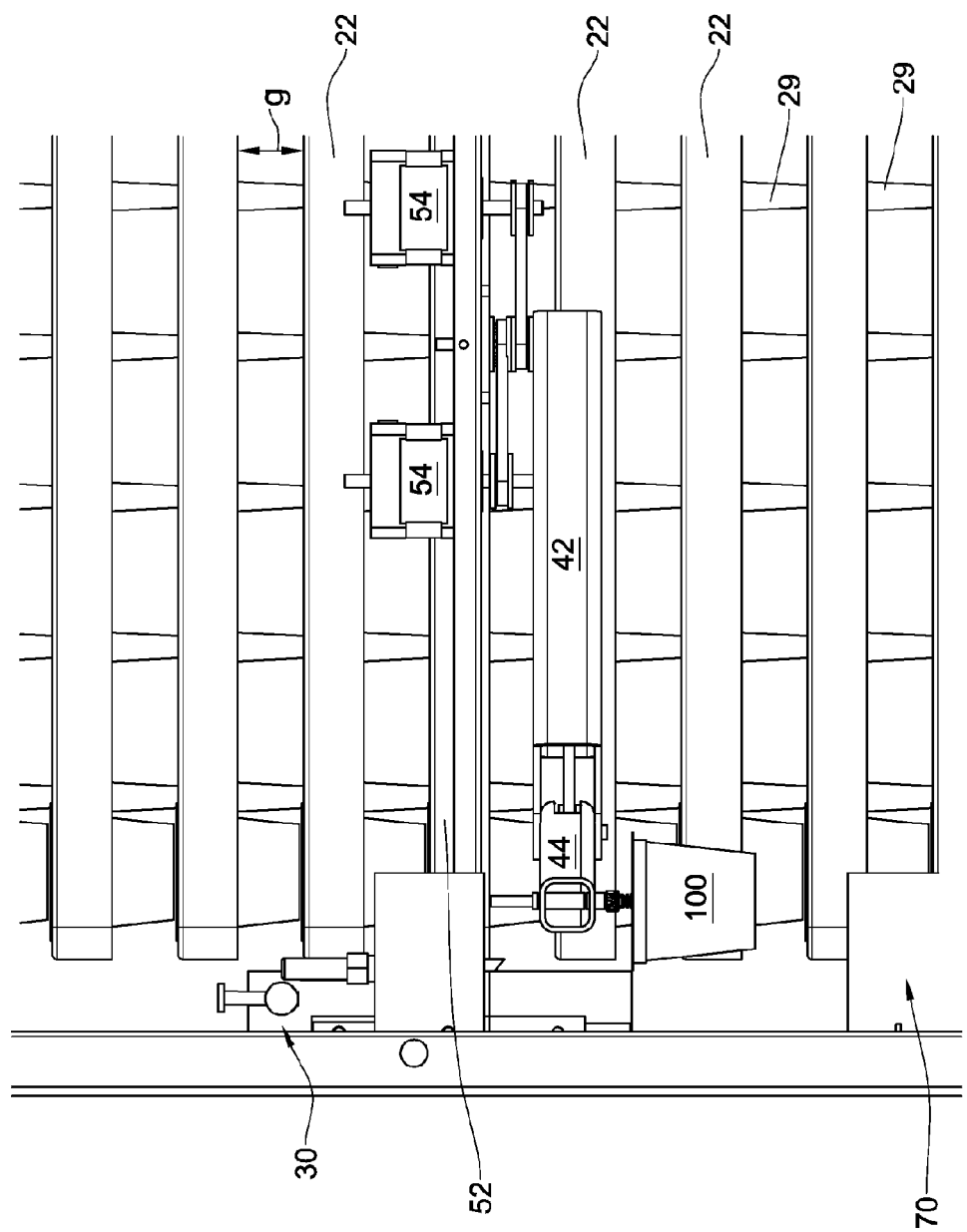

In this position, as shown in FIGS. 5H and 5J, the item 100 is retrieved, the tray system 20 is back in its initial position, the anchor stubs 35 are in their retracted position and the lift mechanism 30 has essentially completed its function for this round of operation. From this position, the retrieving system RS is free to displace downwards towards the bottom of the housing in order to allow the item 100 to be delivered to the processing station 70 by the robotic retrieving arrangement 40.

Figure 5K:
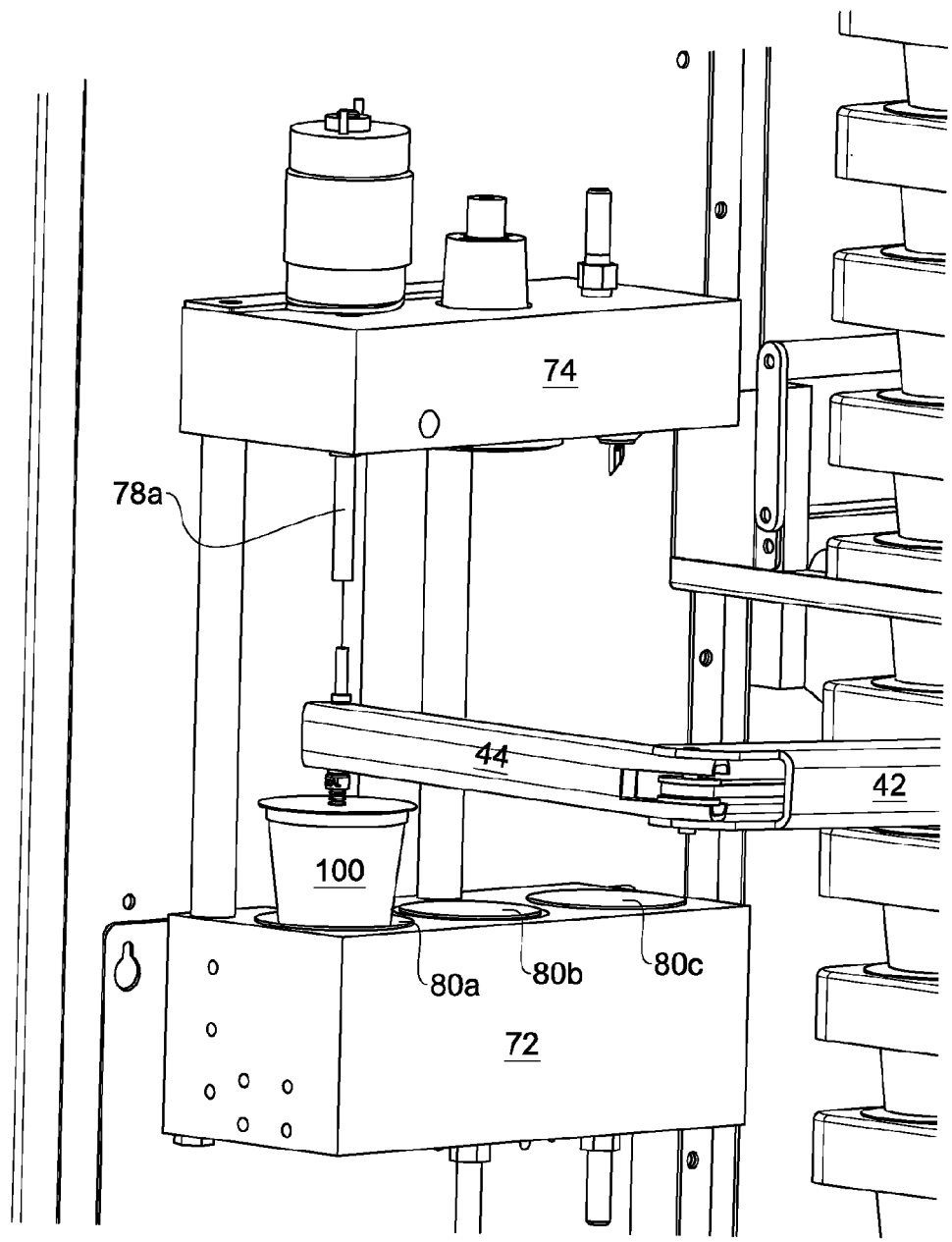

Turning now to FIG. 5K, the robotic retrieving arrangement 40 is configured for bringing the item 100 to the processing station 70, and placing the item 100 in the appropriate processing port 80.

Figure 6A:
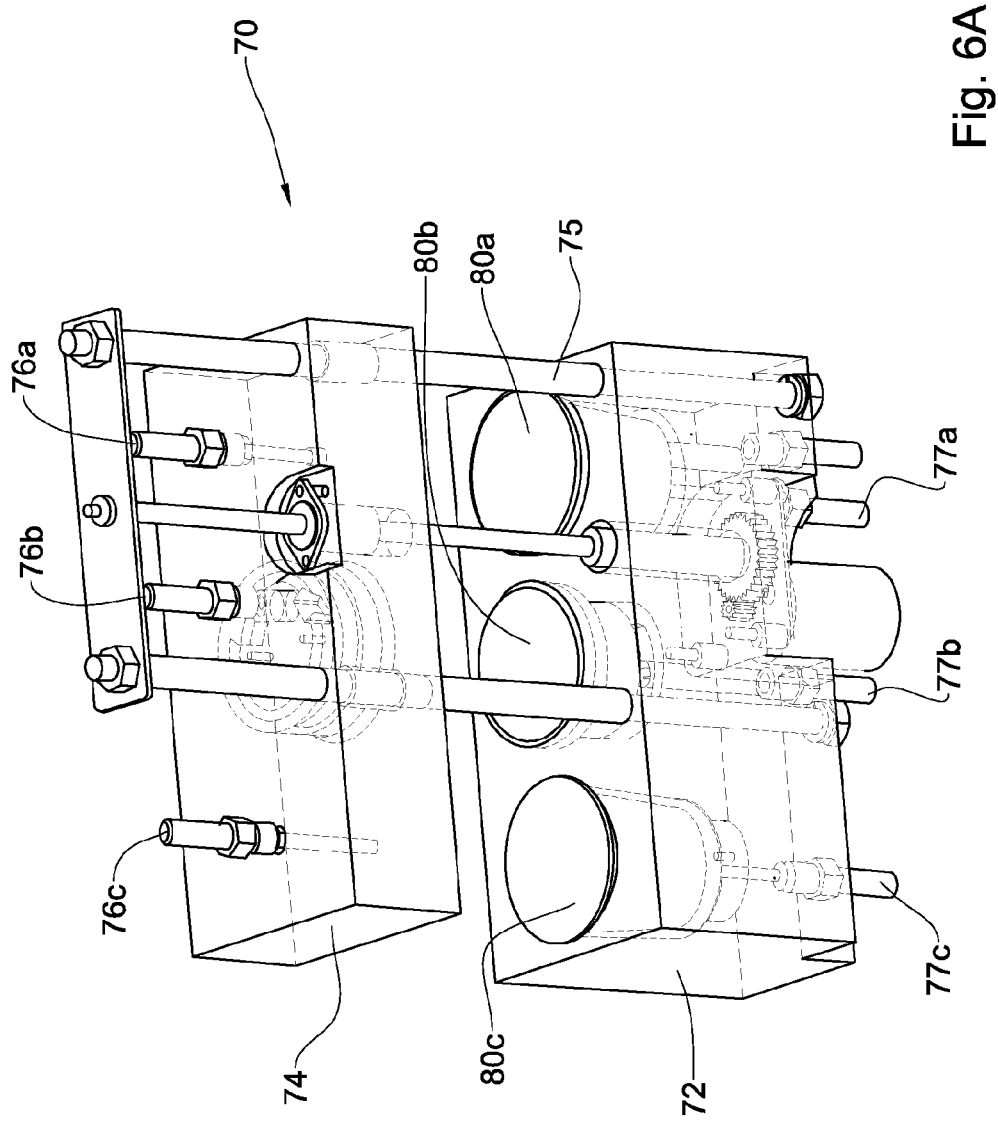
FIGS. 6A and 6B are schematic isometric views of a processing station used in the vending machine shown in FIGS. 1A to 2D.
Figure 6B:
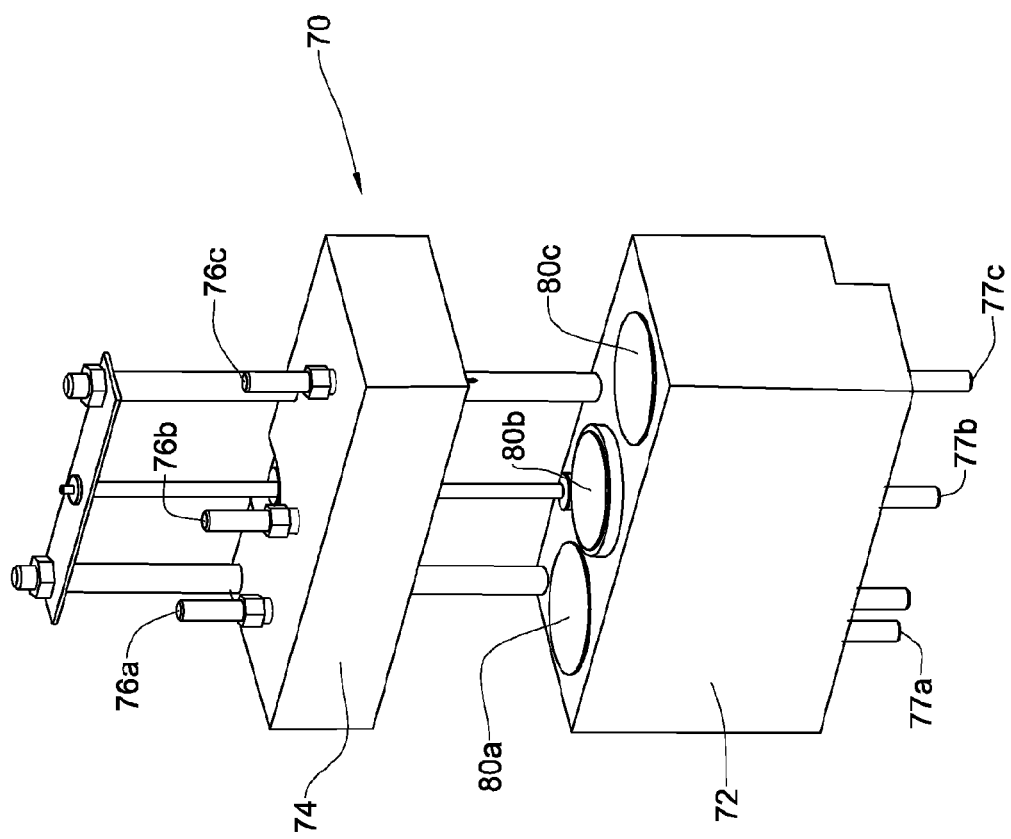

With additional reference being made to FIGS. 6A and 6B, the processing station comprises a base block 72 formed with three processing ports 80*a*, 80*b* and 80*c*, each configured for receiving therein an item 100 of a different type, and a seal block 74 configured for vertical displacement along a track 75 in order to assume the following position:

insertion position in which the seal block 74 is spaced from the base block 72 to a sufficient amount allowing placing of the item 100 within the appropriate processing port 80*a*, 80*b*, 80*c*; and a seal position in which the seal block 74 firmly rests on top of the base block 72.

It is also observed that the seal block 74 is provided with three fluid input lines 76*a*, 76*b*, 76*c* corresponding in function and position to the processing ports 80*a*, 80*b*, 80*c*. In addition, the seal block 74 is provided with puncturing members 78*a*, 78*b*, 78*c* corresponding to the processing ports 80*a*, 80*b*, 80*c* and configured for puncturing the seal of the item 100 in order to allow provision of fluid therein.

The base block 72 is provided with three fluid outlet lines 77*a*, 77*b*, 77*c* corresponding in function and position to the processing ports 80*a*, 80*b*, 80*c*. In addition, the base block 72 is provided with puncturing members 79*a*, 79*b*, 79*c* corresponding to the processing ports 80*a*, 80*b*, 80*c* and configured for puncturing the bottom of the item 100 in order to allow extraction of fluid therefrom.

Once the item 100 is brought above the appropriate of the processing port 80*a*, 80*b*, 80*c* (see FIG. 5K), the robotic arm displaces it downwards sufficiently to cause puncture of the bottom thereof by the corresponding of the puncture members 79*a*, 79*b*, 79*c* of the base block 72. Thereafter, the seal block 74 is displaced downwards into a sealed position, whereby the seal of the item 100 is punctured by the corresponding of the puncture members 78*a*, 78*b*, 78*c*.

Once so, fluid is passed though the processing station in order to produce the required drink/beverage based on the item 100 introduced into the processing port. The prepared drink/beverage flows from the corresponding of the outlet lines 77*a*, 77*b*, 77*c* into a disposable cup and is provided to the user by the delivery arrangement 97.

Thereafter, the seal block 74 displaces upwards into its insertion position, allowing the robotic retrieving arrangement 40 to access the package of the emptied item 100', pick it up and dispose of it in a designated bin 92. By this stage, the entire process is accomplished and the machine is ready for performing another operational sequence.

It is noted that since the entire retrieval system RS is completely dynamic, it is not required to return the retrieval system RS into an original position so that, once disposed of the empty package 100', it is completely ready to perform another sequence.

The above described stages of the operation of the vending machine 1 are regulated by the controller 200 as further described herein.

Attention is drawn to FIG. 7, showing a schematic functional block diagram of a back-office system according to certain examples of the presently disclosed subject matter.

According to some examples of the presently disclosed subject matter, back-office system 490 can comprise (or be otherwise associated with) one or more processing units 400 including multiple and/or parallel and/or distributed processing units, which are configured to manage and control components and execute relevant back-office system 490 operations.

In some cases, back-office system 490 can further comprise (or be otherwise associated with) a back-office data repository 410 for storing and enabling retrieval of various data, as further detailed below.

Still further, back-office system 490 can further comprise one or more of the following modules (that can also be distributed): CSUs builder module 430, CSUs authentication module 440, vending machines management module 450, dynamic inventory management module 460, vending machines inventory monitoring module 420 and network interface 480.

Figure 12:
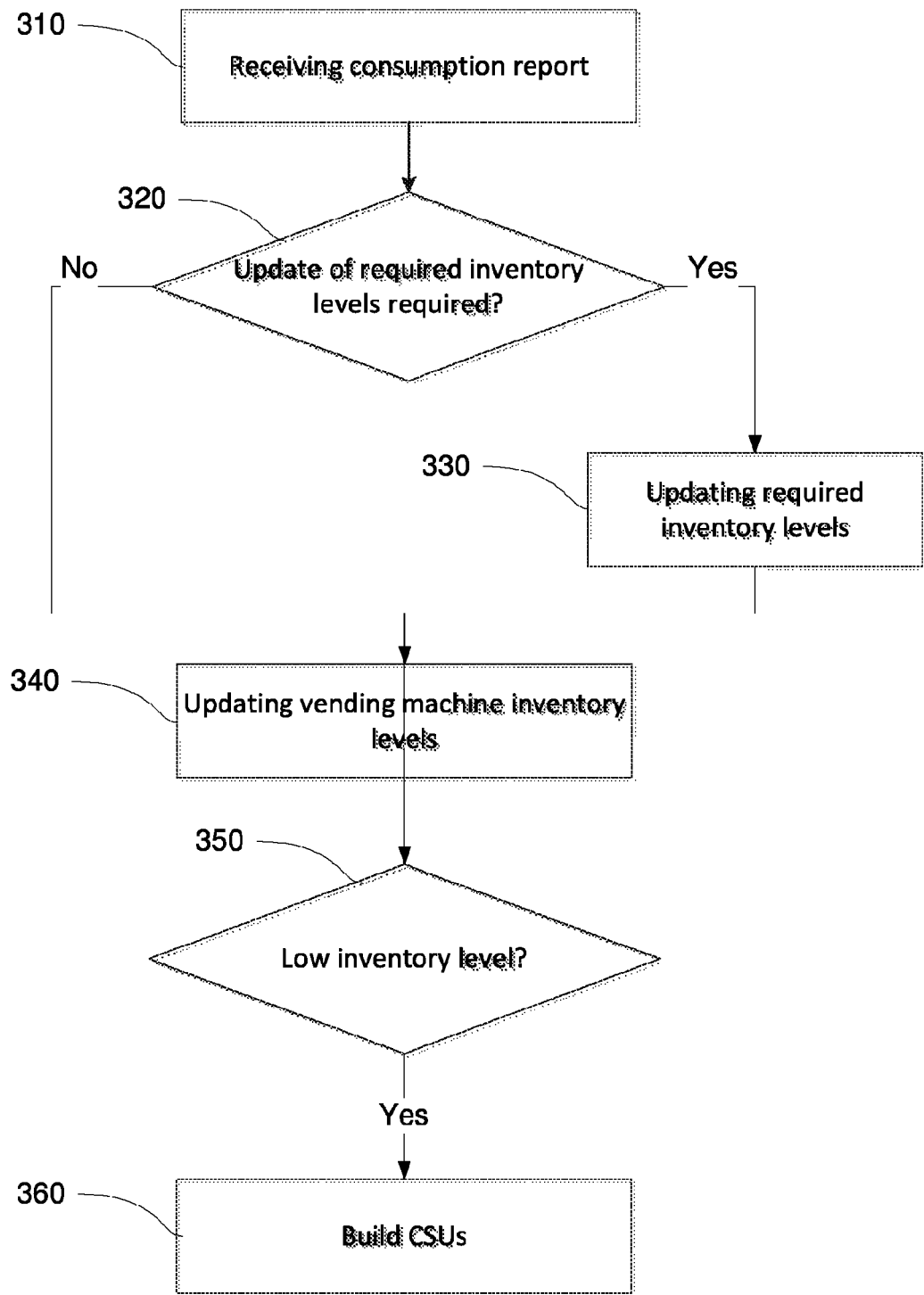
FIG. 12 is a generalized flowchart illustrating a sequence of operations carried out for handling consumption reports, according to certain examples of the presently disclosed subject matter.

In some cases, CSUs builder module 430 can be configured to calculate the content of CSUs 22 to be delivered to the vending machines 1 that require refilling, as further detailed herein, inter alia with reference to FIG. 12.

Figure 13:
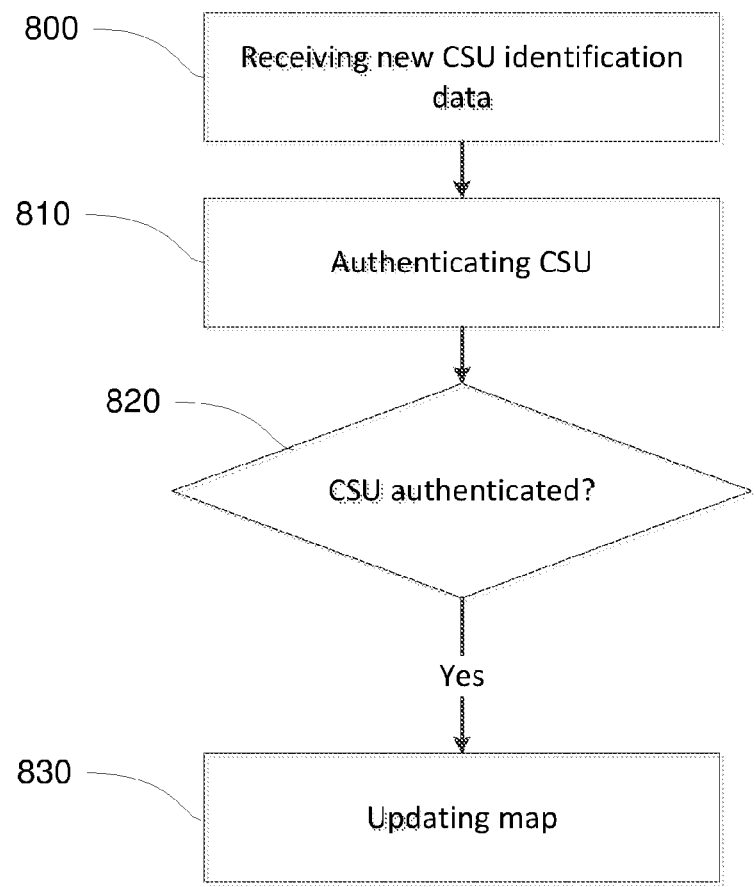
FIG. 13 is a generalized flowchart illustrating a sequence of operations carried out for refilling a vending machine, according to certain examples of the presently disclosed subject matter.

In some cases, CSUs authentication module 440 can be configured to authenticate that a CSU 22 inserted to a vending machine 1 is indeed authentic and if so provide the CSU 22 mapping to the receiving vending machine 1, as further detailed herein, inter alia with reference to FIG. 13.

In some cases, vending machines management module 450 can be configured to deploy a new vending machine 1, which can include defining its location, determining various parameters associated therewith (e.g. inventory levels defining amounts of items of each kind, recipes defining various combinations of items to be combined to a form products that can be dispensed, etc.). Additionally or alternatively, vending machines management module 450 can be configured to transmit data indicative of new or updated recipes to one or more vending machines, to delete recipes from one or more vending machines, to perform software updates in one or more vending machines, to transmit marketing, promotional or advertising content for display on a user interface 230 of one or more vending machines 1, etc.

In some cases, dynamic inventory management module 460 can be configured to dynamically calculate inventory levels of various items within the vending machines 1 and, for example using data indicative of historical products demand (based on consumption reports) relating to the respective vending machines 1, and update the inventory levels of the respective vending machine 1 accordingly, as further detailed herein, inter alia with reference to FIG. 12.

In some cases, vending machines inventory monitoring module 420 can be configured to monitor the inventory levels of the vending machines, as further detailed herein, inter alia with reference to FIG. 12.

In some cases, network interface 480 (e.g. a network interface card, or any other suitable device), for example for enabling back-office system 490 to communicate with one or more vending machines 1 as further detailed herein, inter alia with reference to FIG. 12.

Turning to FIG. 8, there is shown a schematic functional block diagram of a vending machine according to certain examples of the presently disclosed subject matter.

According to some examples of the presently disclosed subject matter, vending machine 1 can comprise (or be otherwise associated with) one or more controllers 200. The one or more controllers 200 can be a processing unit, a microprocessor, a microcontroller or any other computing device or module, including multiple and/or parallel and/or distributed processing units, which are configured to manage and control components and execute relevant vending machine 1 operations.

In some cases, vending machine 1 can further comprise (or be otherwise associated with) a vending machine data repository 210 for storing and enabling retrieval of various data, as further detailed below.

Still further, vending machine 1 can further comprise one or more of the following modules (that can also be distributed): product processing module 220, user interface 230, items repositioning module 240, network interface 250 and tray reader 290.

Figure 9:
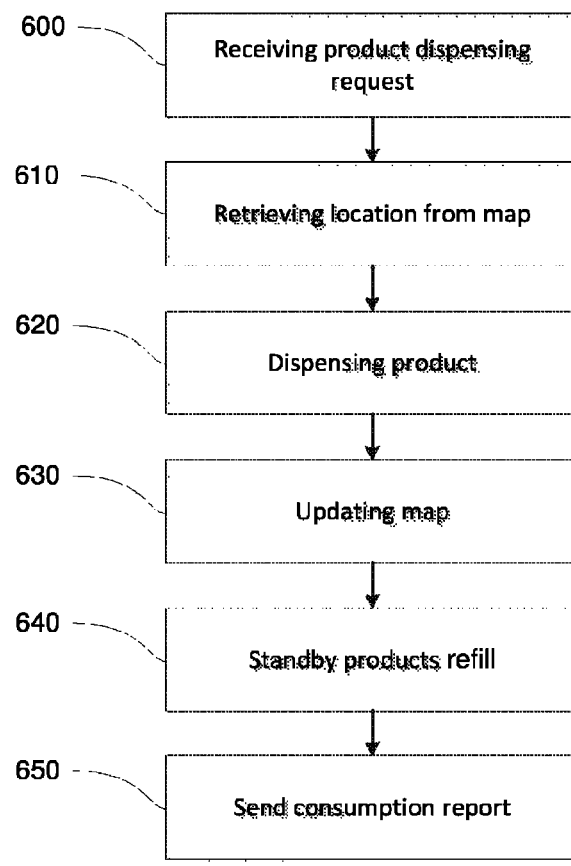
FIG. 9 is a generalized flowchart illustrating a sequence of operations carried out for processing a product dispensing request, according to certain examples of the presently disclosed subject matter.

In some cases, product processing module 220 can be configured to process a product dispensing request, as further detailed herein, inter alia with reference to FIG. 9.

In some cases, user interface 230 can be configured to operate one or more output devices such as displays (e.g. LCD displays, etc.) for presenting various data to the users.

Figure 11:
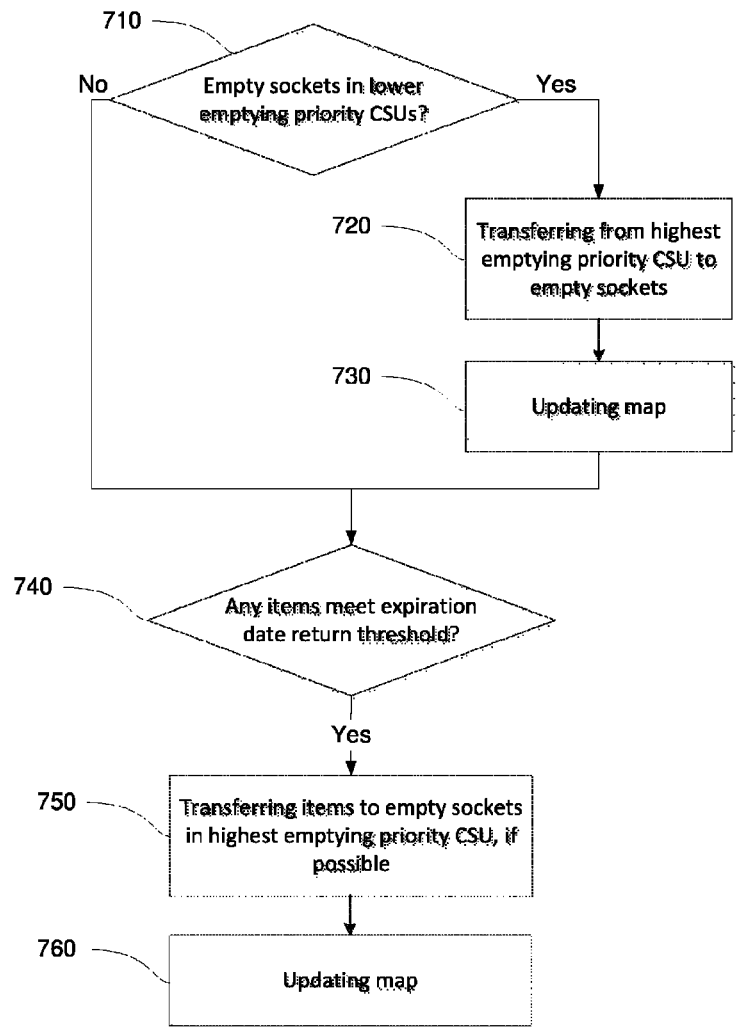
FIG. 11 is a generalized flowchart illustrating a sequence of operations carried out for repositioning items, according to certain examples of the presently disclosed subject matter.

In some cases, items repositioning module 240 can be configured to reposition items in compartments of the CSUs (e.g. move an item from a certain compartment within a certain CSU to another compartment within the same or another CSU), for example by utilizing the retrieving mechanism 40, as further detailed herein, inter alia with reference to FIGS. 9 and 11.

In some cases, network interface 250 (e.g. a network interface card, or any other suitable device), for example for enabling vending machine to communicate with one or more back-office systems 490 as further detailed herein, inter alia with reference to FIG. 12.

In some cases, CSU reader 290 can be configured to read data relating to CSUs, as further detailed herein, inter alia with reference to FIG. 13.

Attention is now drawn to FIG. 9, a generalized flowchart illustrating a sequence of operations carried out for processing a product dispensing request, according to certain examples of the presently disclosed subject matter.

According to some examples of the presently disclosed subject matter, vending machine 1 controller 200 (e.g. by utilizing product processing module 220) can be configured to receive a product dispensing request (received from a user, for example using a user interface 230), including data indicative of a selected product type (block 600). Following receipt of the product dispensing request, controller 200 (e.g. by utilizing product processing module 220) can be further configured to retrieve the location of a certain item 100, or one or more items 100, required for preparation of the product of the selected product type, in the storage tray system 20 (block 610).

The location of the certain item 100 can be retrieved from a dynamic items map (that can be stored, for example, on vending machine data repository 210, on back-office data repository 410 or on any other location accessible by the controller 200), that identifies the location of the items 100 currently available in the vending machine 1. In some cases, the items map can comprise a plurality of CSU items maps, each identifying the location of the items 100 currently available in the respective CSU 22.

Figure 10:
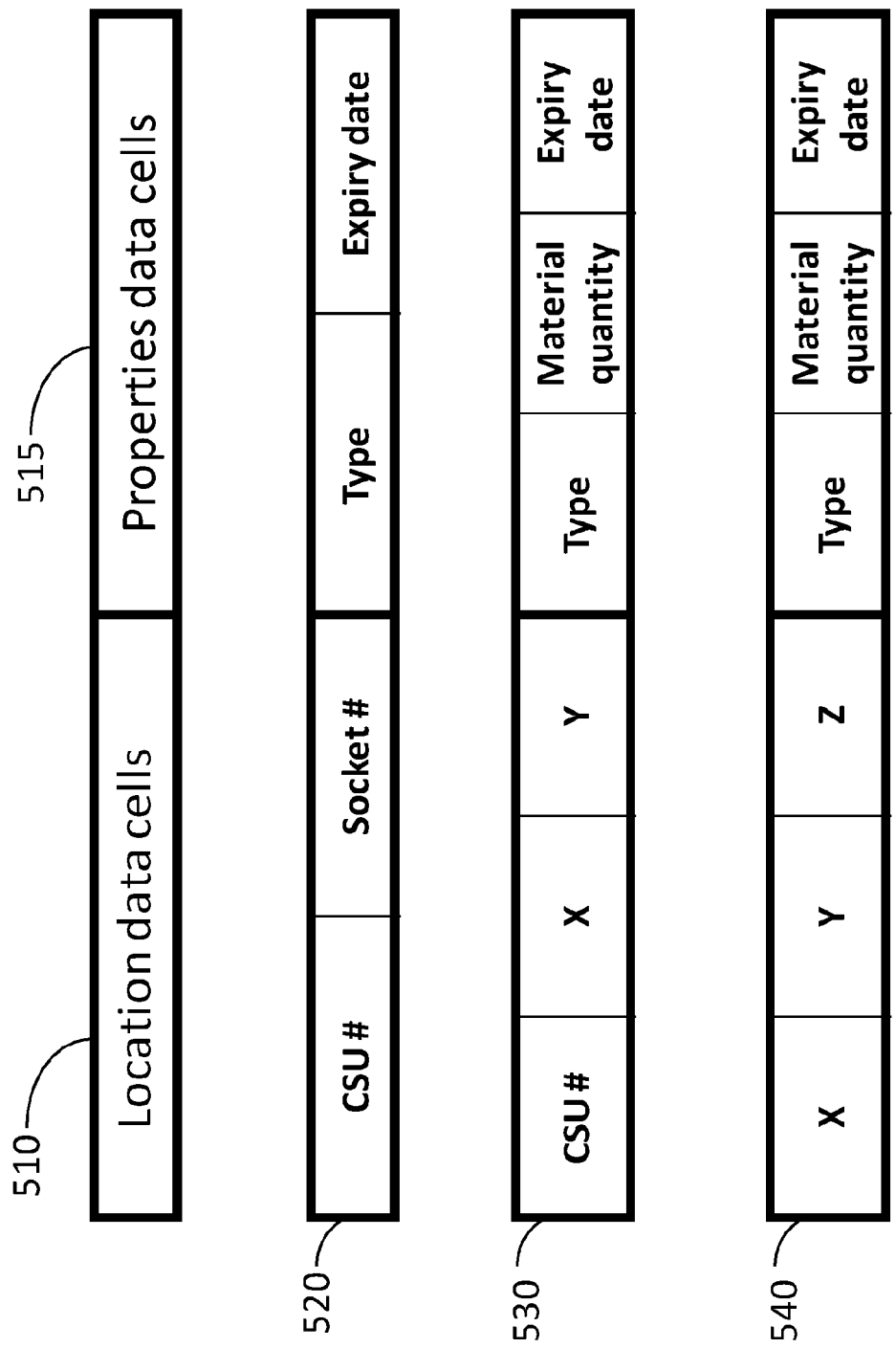
FIG. 10 is a schematic illustration of examples of data structures for storing the dynamic items map.

In order to explain the dynamic items map data structure, attention is drawn to FIG. 10, showing a schematic illustration of examples of data structures for storing the dynamic items map, in accordance with the presently disclosed subject matter. In general, the data structure of the dynamic items map can comprise data indicative of the location of the compartments 24 (block 510) and data indicative of the properties of the items 100 within the respective compartments 24 (block 515), where the properties include at least data indicative of the item type. The following are several non limiting examples of data structures that can be used in order to represent the dynamic items map:

Example 1 (block 520): a CSU 22 number (which the vending machine translates if necessary into a CSU position in a stack), and a compartment 24 number within the CSU 22, an item type identifier for indicating the item 100 currently present at that location, and optionally additional information including, for example, an indication of the expiry date of the item 100, etc.

Example 2 (block 530): a CSU 22 number and (X,Y) coordinates corresponding to a row number and a compartment 24 location within the row, again with an item type identifier for indicating the item 100 currently present at that location, an indication of the quantity of the item 100 at the compartment 24, and an expiry date.

Example 3 (block 540): as per example 2 but defining the location using a three dimensional coordinate system.

Clearly, an equivalent effect can be achieved using many other data structures (such as, for example, a simple linear array) so long as the controller 200 can translate the stored information into actuation signals to the retrieving mechanism 40 to retrieve a desired item 100 from the corresponding location.

Having described the dynamic items map, attention is drawn back to FIG. 9. In some cases, controller 200 can be further configured to retrieve the location of the certain item, or one or more items, required for preparation of the product of the selected product type, while taking into account also the expiration dates of the available items and their accessibility. Thus, in some cases, controller 200 can be configured to give a priority to items of the selected product type (or one or more items required for preparation of the product) that have the closest expiration date. Alternatively or additionally, controller 200 can be configured to give a priority to items of the selected product type (or one or more items required for preparation of the product) that are located at a rapid access CSU, that is a CSU that is accessible in the storage tray system 20 while it is in a "standby" or idle state—thereby reducing the time required to complete product vending.

In some cases, controller 200 (e.g. by utilizing product processing module 220) can be configured to operate the retrieving mechanism 40 and the suitable processing port 80 of the processing station 70 for dispensing the required product using the one or more items required for preparation of the product (block 620) and to update the items map to indicate that the compartment 24 or compartments 24 that contained the one or more items required for preparation of the product are now empty (block 630).

According to some examples of the presently disclosed subject matter, in case one or more compartments 24 within the rapid access location are empty (for example because of the fact that the items that were stored within these compartments have been used for dispensing the product), controller 200 (e.g. by utilizing items repositioning module 240) can be configured to refill such empty compartments 24 (block 640). For example, controller 200 (e.g. by utilizing items repositioning module 240) can reposition items 100 during waiting periods between dispensing operations to ensure that at least one of each item, and/or a plurality of certain particularly popular items, are on a CSU 22 that is accessible in a "standby" or idle state of the vending machine 1.

In some cases, controller 200 (e.g. by utilizing product processing module 220) can be configured to send the back-office system 490 a consumption report indicating what items have been consumed (block 650). In some cases, the consumption report can be sent to the back-office system 490 after vending each product. Additionally or alternatively, the consumption report can be sent to the back-office system 490 periodically or continuously. Additionally or alternatively, the consumption report can be sent to the back-office system 490 following a request from the back-office system 490 (that can be issued, for example, periodically and/or prior to a visit to the machine location or to a certain area in which it is located by a supplier and/or following an administrator command, etc.). Additionally or alternatively, the consumption report can be sent to the back-office system 490 when the controller 200 determines that the inventory levels are low (e.g. in accordance with an inventory monitoring criteria such as a low inventory threshold indicating the minimal number of items of each kind that are required to be available in the vending machine 1).

It is to be noted that, with reference to FIG. 9, some of the blocks can be integrated into a consolidated block or can be broken down to a few blocks and/or other blocks may be added. Furthermore, in some cases, the blocks can be performed in a different order than described herein (for example, block 630 can be performed before block 620, block 640 can be performed before block 630, block 630 can be performed after block 640, etc.). It is to be further noted that some of the blocks are optional. It should be also noted that whilst the flow diagram is described also with reference to the system elements that realizes them, this is by no means binding, and the blocks can be performed by elements other than those described herein.

Turning to FIG. 11, there is shown a generalized flowchart illustrating a sequence of operations carried out for repositioning items, according to certain examples of the presently disclosed subject matter.

In some cases, while not vending products, the controller 200 can be configured to consolidate items on fewer CSUs 22, thus making empty CSUs 22 available to be removed and replaced with newly delivered CSUs 22.

For that purpose, controller 200 (e.g. utilizing items repositioning module 240) can be configured to check if there are one or more empty compartments 24 in CSUs 22 with lower emptying priority in comparison to one or more other non-empty CSUs 22 (block 710). It is to be noted that for that purpose, priorities data indicative of the priorities according to which CSUs 22 are to be emptied is maintained, for example in the vending machine data repository 210, on back-office data repository 410 or on any other location accessible by the controller 200). It is to be noted that in some cases, such priorities data can be pre-determined (e.g. a pre-determined order in which CSUs 22 are to be emptied is available), whereas in other cases the priorities data can be dynamically calculated. As a non-limiting example, a dynamic calculation of the priorities data can include associating the first CSU 22 from which an item 100 is removed with the highest priority to be emptied, and once it is emptied, associating the next CSU 22 from which an item 100 is removed with the highest priority to be emptied, etc.

If there are one or more empty compartments 24 in CSUs 22 with lower emptying priority in comparison to one or more other non-empty CSUs 22 with higher emptying priority, controller 200 (e.g. utilizing items repositioning module 240) can be configured to transfer one or more items from the highest emptying priority non-empty CSU 22 to the empty compartments of the CSUs 22 with the lowest emptying priority that has an empty compartment (block 720). The controller 200 (e.g. utilizing items repositioning module 240) can be further configured to dynamically update the dynamic items map, indicative of items locations, during this process, tracking the position of each item (block 730).

In some cases, controller 200 (e.g. utilizing items repositioning module 240) can be configured to check if the expiration date of one or more of the items 100 meets an expiration data return threshold (block 740). In some cases, the expiration data return threshold can be defined as a certain amount of time prior to the respective item's expiration date. In some cases, each item type can have a different expiration data return threshold. In some cases, the expiration data return threshold can be defined as the respective item's expiration date.

If any items 100 exist that meet the expiration date return threshold, controller 200 (e.g. utilizing items repositioning module 240) can be configured to transfer such items to empty compartments 24 in the CSU 22 associated with the highest emptying priority that has empty compartments 24 (block 750). It is to be noted that in some cases, for example in case no empty compartments 24 are available, or in case it is desired to place items 100 that meet the expiration data return threshold in the highest emptying priority CSU 22 while it has no empty compartments 24, a product buffer area may be provided within the vending machine 1 in case temporary storage is required to perform certain manipulations of item positions. However, typically, during most of the usage cycle, the CSUs 24 themselves will have sufficient spare capacity to allow any required manipulations to be performed. It is to be further noted that in a networked system of multiple vending machines, items which are rarely used in a first vending machine 1 may be returned in good time prior to their expiry dates (for example by setting the expiration data return threshold of all or part of the item types accordingly) for re-allocation in a refill CSU 22 to a different vending machine in a location where that item is used more frequently, thereby minimizing wastage due to expiry of items.

The controller 200 (e.g. utilizing items repositioning module 240) can be further configured to dynamically update the dynamic items map, indicative of items locations, during this process, tracking the position of each item (block 760).

It is to be noted that in some cases, the consolidation can be performed every pre-determined time window. Additionally or alternatively, the consolidation can be performed after every product dispensing. Additionally or alternatively, the consolidation process can be performed when the inventory reaches a certain pre-determined low-level. Additionally or alternatively, the consolidation process can be performed following a demand from the back-office system 490 (e.g. utilizing the vending machines inventory monitoring module 420). Additionally or alternatively, the consolidation can be performed randomly.

It is to be noted that, with reference to FIG. 11, some of the blocks can be integrated into a consolidated block or can be broken down to a few blocks and/or other blocks may be added. Furthermore, in some cases, the blocks can be performed in a different order than described herein (for example, block 730 can be performed before block 720; block 760 can be performed before block 750; blocks 740, 750 and 760 can be performed before blocks 710, 720 and 730; etc.). It is to be further noted that some of the blocks are optional. It should be also noted that whilst the flow diagram is described also with reference to the system elements that realizes them, this is by no means binding, and the blocks can be performed by elements other than those described herein.

Turning to FIG. 12, there is shown a generalized flowchart illustrating a sequence of operations carried out for handling consumption reports, according to certain examples of the presently disclosed subject matter.

According to some examples of the presently disclosed subject matter, processing unit 400 of back-office system 490 (e.g. utilizing consumption report handler module 470) can be configured to receive a consumption report from a certain vending machine 1 (block 310). It is to be noted that the vending machine 1 and the back-office system 490 can utilize, for example, the network interface 250 and network interface 480 (respectively) for establishing communication there between.

In some cases, processing unit 400 (e.g. by utilizing dynamic inventory management module 460) can be configured to check if any update to the required inventory levels of the vending machine 1 from which the consumption report was received is required (block 320) and if so—update (e.g. on back-office data repository 410) the required inventory levels of such vending machine 1 (block 330). It is to be noted that the required inventory levels can define, for example, how many items 100 of each item type are required to be available in the respective vending machine 1. Such update can be required, for example, in case a change in the patterns of use of such vending machine is detected (certain items have a higher demand or consumption rate in comparison to past demand or consumption rates as indicated by past consumption reports, or any other calculation, including various statistical calculations).

In some cases, processing unit 400 (e.g. by utilizing vending machines inventory monitoring module 420) can be configured to update (e.g. on back-office data repository 410) the inventory level (that contains information of the amount of items 100 of each item type available in the respective vending machine 1), in accordance with the received consumption report (block 340).

In some cases, processing unit 400 (e.g. by utilizing vending machines inventory monitoring module 420) can be configured to check if the inventory level of the vending machine 1 is low, for example in accordance to one or more thresholds (block 350). Such thresholds can include, for example, a general threshold, indicating the minimal number of items 100, irrespective of the items types, that are required to be available in the vending machine 1. Additionally or alternatively, the thresholds can include, for example, one or more item type specific thresholds, indicating the minimal number of items 100 of specific respective item types that are required to be available in the vending machine 1.

In some cases, if a low inventory level is detected, processing unit 400 (e.g. by utilizing CSU builder module 430) can be configured to prepare one or more replacement CSUs 22 for the vending machine 1 (block 360). In some cases, processing unit 400 (e.g. by utilizing CSU builder module 430) can be configured to prepare the CSUs 22 for filling a certain vending machine 1 while utilizing the required inventory levels and the actual inventory level of such vending machine 1. In some cases, a CSU items map (indicative of the item type of the item in each of the compartments in the new CSUs 22) can be built by the processing unit 400 (e.g. by utilizing CSU builder module 430) for each new CSU 22. Alternatively, a CSU items map can be provided by an external source (e.g. by an external supplier of items that prepares the new CSUs 22, that are arranged in a random layout, or optimized in layout according to typical patterns of usage, in its premises). It is to be noted that each CSU 22 can be associated with a certain unique CSU ID (that can be a unique numeric ID, a unique string, a unique RFID, a unique barcode, a unique QR code, or any other unique data that enables unique identification of each CSU 22) and each CSU items map can be associated with a certain CSU 22, e.g. using the unique CSU ID. It is to be further noted that each CSU 22 that is prepared can be associated with data enabling identification of the vending machine 1 to which it is designated, also referred to as destination vending machine ID (and such data can be stored, for example, in back-office data repository 410 or in the vending machine data repository 210 of the vending machine 1 to which it is designated). Following preparation of the new CSUs 22 and their respective CSU maps (that can be stored, for example, in back-office data repository 410 or in the vending machine data repository 210 of the vending machine 1 to which such CSUs 22 are designated), such CSUs 22 are ready to be delivered to the respective vending machine 1 to which they are designated.

It is to be noted, with reference to FIG. 12 and in general, that in some cases, one or more of the vending machines 1 can also operate as a back-office system 490 with which it, and/or other vending machines 1, are associated. In such cases, processing unit 400 and controller 200 can be the same component or they can be used interchangeably. In addition, in such cases back-office data repository 410 and vending machine data repository 210 can be the same component or they can be used interchangeably.

It is to be further noted that, with reference to FIG. 12, some of the blocks can be integrated into a consolidated block or can be broken down to a few blocks and/or other blocks may be added. Furthermore, in some cases, the blocks can be performed in a different order than described herein (for example, blocks 340, 350 and 360 can be performed before blocks 320 and 330; block 340 can be performed before block 320; etc.). It is to be further noted that some of the blocks are optional. It should be also noted that whilst the flow diagram is described also with reference to the system elements that realizes them, this is by no means binding, and the blocks can be performed by elements other than those described herein.

Turning to FIG. 13, there is shown a generalized flowchart illustrating a sequence of operations carried out for refilling a vending machine, according to certain examples of the presently disclosed subject matter.

In some cases, the updating of the dynamic items map relating to each newly inserted CSU enables to ensure that authentic products are used in the vending machine 1. It can be appreciated that handling of the items within the vending machine 1 according to the presently disclosed subject matter is predicated on the existence of an up-to-date mapping of the locations of items in the CSUs. If an unauthorized item is inserted into an empty compartment 24 of a CSU 22, or if an unauthorized CSU 22 comprising items 100 is inserted into the vending machine 1 without proper updating of the dynamic items map, the inserted items will never be dispensed since the controller 200 considers the corresponding compartments 24 to be empty. Therefore, when inserting a new CSU 22 into a vending machine, an authentication process can be performed, as detailed herein.

According to some examples of the presently disclosed subject matter, controller 200 (e.g. utilizing refill module 260) can be configured to receive CSU identification data that enables identification of a new CSU designated to the vending machine 1. In some cases such CSU identification data can be a CSU ID (block 800). In some cases, the CSU identification data 1 can be received manually (e.g. by utilizing a suitable input device, connected to the vending machine 1 or in network communication therewith, such as a keyboard, a touchpad or any other suitable input device), for example from an operator (e.g. the human operator that refills the vending machine with one or more CSUs 22 and/or a remote human operator, or any other entity). Additionally or alternatively, the CSU identification data can be received using CSU reader 280 that can be configured to read such data from the one or more CSUs 22 that are designated to the vending machine 1.

In some cases, controller 200 (e.g. utilizing refill module 260) can be configured to authenticate the CSUs 22 inserted (or about to be inserted) into the vending machine 1 (block 810). Such authentication can include checking if the new CSU's 22 destination is indeed the receiving vending machine 1. As indicated herein, each CSU 22 has a certain unique CSU ID, and a certain destination (vending machine 1) that is determined for it (as detailed herein, inter alia with reference to FIG. 12 and more specifically with reference to block 360).

In some cases, the data about the destination of each CSU 22 can be stored on the back-office system 490. In such cases, controller 200 (e.g. utilizing refill module 260) can be configured to send the CSU ID of the CSU 22 inserted to the vending machine, and data indicative of the vending machine 1 to which the CSU 22 was inserted (e.g. a vending machine ID), to the back-office system 490. The back-office system 490, can be configured to check (e.g. by utilizing CSU authentication module 440) if indeed the respective CSU 22 is designated to the respective vending machine 1 and send an appropriate indication back to the vending machine 1.

In other cases, each vending machine 1 can receive data indicative of CSUs 22 that are designated to it, for example following preparation of such CSUs 22 and prior to their arrival to the vending machine. Such data can be stored locally (e.g. in vending machine data repository 210). In such cases, the check if indeed the respective CSU 22 is designated to the respective vending machine 1 can be performed locally, e.g. by utilizing authentication module 270.

It is to be noted that other methods for authenticating that the CSU is designated to the vending machine to which it was inserted (or is about to be inserted) can be utilized as well.

In case the CSU is authenticated (block 820), a process for updating the items map to indicate the existence of the new CSUs 22 and the locations of the various new items 100 within the new CSUs 22 can be performed (block 830). This process can be performed by using a secured data transfer between the back-office system 490 and the vending machine 1 (e.g. via a wide-area network). The secured data transfer may be performed using an encrypted networked communication between the back-office system 490 and the vending machine 1. Alternatively, the new CSU 22 items map can be provided locally from a unit carried by the person performing the refilling, either by wired or short-range wireless connection. As another alternative, a non-volatile data in storage device comprising the new CSU 22 items map can be mated with the controller or optionally physically linked or integrated into the tray. Optionally, the data transfer may require a code or other data provided with or encoded on the new CSU 22 in order to initiate the data transfer or unlock/decode the data for use. Clearly, some or all of the above described precautions may be replaced with other known data authentication precautions, all as will be clear to one ordinarily skilled in the art.

As a result of these arrangement, it becomes very difficult for an unauthorized person/entity to replenish the vending machine 1 with unauthorized items 100, since the dispensing process cannot be performed without a corresponding updating of the items map which can only be performed through the aforementioned secured data transfer and/or by overcoming other data authentication precautions designed into the system.

It is to be further noted that, with reference to FIG. 13, some of the blocks can be integrated into a consolidated block or can be broken down to a few blocks and/or other blocks may be added. It is to be further noted that some of the blocks are optional. It should be also noted that whilst the flow diagram is described also with reference to the system elements that realizes them, this is by no means binding, and the blocks can be performed by elements other than those described herein.

Having described the figures, it is to be noted that the presently disclosed subject matter can be particularly suitable for dispensing beverages for which raw materials are stored in capsules (such as different types of ground coffee, flavored coffee, tea, fruit-juice concentrate, and any other sort of infusion, soluble powder or concentrate used to prepare a hot or cold beverage). However, the invention is not limited to such beverage dispensing, and may alternatively or additionally be used for vending any and all other small items stored in separate sealed packages. In addition, although in some cases some of the products require processing prior to dispensing, it should be noted that the systems according to the presently disclosed subject matter may also be used to advantage with many other types of products, particularly (however not thus limited) where there is a demand for multiple types or flavors of products. Additional non-limiting exemplary applications include ice creams, yoghurts and other dairy products, in which it is common to have multiple flavors, brands and/or levels of fat content. Additional non-limiting exemplary applications include medications and pharmaceutical supplies. Additional non-limiting exemplary applications include candy, cookies and other similar products.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

Those skilled in the art to which this invention pertains will readily appreciate that numerous changes, variations, and modification can be made without departing from the scope of the invention, mutatis mutandis.

The invention claimed is:

1. A vending machine comprising:
   two or more compartmentalized storage units (CSUs), each comprising a compartment array configured for accommodating two or more items in different compartments of the grid, the items being independently accessible;
   a retrieval system configured for accessing at least one of said compartments to retrieve at least one of said two or more items and providing the retrieved item to a desired location within the vending machine, other than its respective compartment;
   a controller associated with an items map indicative of the content and location of at least one of the two or more items within the compartment array of the CSU, the controller being configured for operating said retrieval system to access at least one of said two or more items based on said items map;
   wherein said controller is further configured and operable to: designate a first CSU of said CSUs based on a given characteristic thereof;
   receive an indication of the location of at least a first empty compartment, which contains no item therein, in at least said first CSU;
   transfer at least a first item from a second compartment of a second CSU of said CSUs to said first empty compartment; and
   update said items map to indicate that said second compartment is empty and that said first item is located at said first compartment of the first CSU, and
   wherein said first CSU is associated with a first emptying priority and said second CSU is associated with a second emptying priority, and wherein said second emptying priority is higher than said first emptying priority, said first and second emptying priorities being determined according to:
   said given characteristic of said first CSU;
   a parameter associated with the second CSU; and
   a parameter associated with the item to be moved.

2. The vending machine of claim 1, wherein said controller is further configured and operable to:
   receive an indication of one or more given items within said first CSU, said given items meeting an expiration date return threshold indicative of nearing the expiration date of said one or more given items; and
   transfer at least one of said given items to a given compartment of said second CSU.

3. A vending machine comprising:
   at least one compartmentalized storage unit (CSUs) configured with an array of compartments for accommodating two or more items at different locations of the array, the items being independently accessible, wherein said CSU is removably received within the vending machine, thereby enabling replacement thereof with a new CSU;
   a retrieval system configured for accessing the compartment array to retrieve items therefrom and providing a retrieved item to a desired location within the vending machine;
   a controller associated with an items map of the array said map indicative of the content and location of the items within the compartment array of the CSU, the controller being configured and operable to operate said retrieval system to access different locations of the array based on said items map providing an output signal responsive to which said items map is updated following the retrieval of an item from the compartment array;
   wherein said controller is further configured and operable to:
   receive, at the vending machine, CSU identification data enabling identification of a new CSU;
   authenticate the new CSU, using at least the CSU identification data; and
   in case the authentication is successful, receive, from an external source separate from the vending machine, an update to the items map, said update being indicative of the content of a plurality of compartments of said new CSU.

4. The vending machine of claim 3, wherein said controller is further configured to:
   receive a product dispensing request including data indicative of a selected product type;
   retrieve from said items map a location of one or more items required for dispensing of a product of the selected product type;
   dispense the product utilizing the one or more items; and
   update the items map to indicate that the locations of said one or more items are empty.

5. The vending machine of claim 4, wherein said controller is further configured to:
   receive an indication of at least a first compartment that is empty in at least a first CSU of said CSUs;

transfer at least a first item from a second compartment of a second CSU of said CSUs to said first compartment; and update said items map to indicate that said second compartment is empty and that said first item is located at said first compartment.

6. The vending machine of claim 5, wherein said controller is further configured to send a consumption report to a back-office system, wherein said consumption report includes information indicative of the utilization of the one or more items, said consumption report is sent to said back-office system following determination that the inventory levels of said vending machine are low.

7. The vending machine of claim 6, wherein said new CSU is associated with a destination vending machine ID and wherein during said authenticate, the controller is configured to verify that the destination vending machine ID associated with the new CSU is identical to a vending machine ID of the vending machine.

8. A vending machine according to claim 3, wherein said lift mechanism is configured, by the above lifting, for increasing the gap g to G so as to allow the retrieval system to access a predetermined compartment array.

9. A method for refilling a vending machine comprising one or more compartmentalized storage units (CSUs), the method comprising:
receiving, at the vending machine, CSU identification data enabling identification of a new CSU, wherein said new CSU comprises a plurality of compartments;
authenticating the new CSU, using at least the CSU identification data; and
in case the authentication is successful, receiving, from an external source separate from the vending machine, an items map indicative of the content of a plurality of compartments of said new CSU.

10. The method of claim 9, further comprising:
receiving a product dispensing request including data indicative of a selected product type;
retrieving from said items map a location of one or more items required for dispensing of a product of the selected product type;
dispensing the product utilizing the one or more items; and
updating the items map to indicate that the locations of said one or more items are empty.

11. The method of claim 10, further comprising:
receiving an indication of at least a first compartment that is empty in at least a first CSU of said CSUs;
transferring at least a first item from a second compartment of a second CSU of said CSUs to said first compartment; and
updating said items map to indicate that said second compartment is empty and that said first item is located at said first compartment.

12. The method of claim 10, further comprising sending a consumption report to a back-office system, wherein said consumption report includes information indicative of the utilization of the one or more items, wherein said consumption report is sent to said back-office system following determination that the inventory levels of said vending machine are low.

13. The method of claim 9, wherein said CSU identification data is a CSU ID, and wherein said new CSU is associated with a destination vending machine ID and wherein said authenticating comprises verifying that the destination vending machine ID associated with the new CSU is identical to a vending machine ID of the vending machine.

14. A method for distributing a plurality of items between a plurality of compartmentalized storage units (CSUs), the method comprising:
providing an items map indicative of the content of a plurality of compartments of said plurality of CSUs;
designating a first CSU of said plurality of CSUs based on a given characteristic thereof;
receiving an indication of at least a first compartment that is empty in at least said first CSU;
transferring at least a first item from a second compartment of a second CSU of said CSUs to said first compartment; and
updating said items map to indicate that said second compartment is empty and that said first item is located at said first compartment of the first CSU,
wherein said first CSU is associated with a first emptying priority and said second CSU is associated with a second emptying priority, and
wherein said second emptying priority is higher than said first emptying priority, said first and second emptying priorities being determined according to:
said given characteristic of the first CSU;
a parameter associated with the second CSU; and
a parameter associated with the item to be moved.

* * * * *